(12) United States Patent
Bran De León et al.

(10) Patent No.: US 11,870,229 B2
(45) Date of Patent: Jan. 9, 2024

(54) CONNECTION INTERFACE

(71) Applicant: CommScope Technologies LLC, Hickory, NC (US)

(72) Inventors: Oscar Fernando Bran De León, Belle Plaine, MN (US); Thomas Marcouiller, Shakopee, MN (US); Peter C. Augdahl, Prior Lake, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/878,583

(22) Filed: Aug. 1, 2022

(65) Prior Publication Data
US 2022/0368117 A1    Nov. 17, 2022

Related U.S. Application Data

(63) Continuation of application No. 17/144,659, filed on Jan. 8, 2021, now Pat. No. 11,411,377.

(60) Provisional application No. 62/959,468, filed on Jan. 10, 2020.

(51) Int. Cl.
*H02G 3/04* (2006.01)
*F16L 3/22* (2006.01)

(52) U.S. Cl.
CPC ............ *H02G 3/0456* (2013.01); *F16L 3/221* (2013.01)

(58) Field of Classification Search
CPC .......... H02G 3/0456; H02G 3/10; H02G 3/14; G16L 3/221; G02B 6/4452; G02B 6/3897; G02B 6/3825
See application file for complete search history.

(56) References Cited

U.S. PATENT DOCUMENTS

| | | | | |
|---|---|---|---|---|
| 4,306,697 A * | 12/1981 | Mathews | ............... | F16L 3/222 |
| | | | | 248/68.1 |
| 5,697,811 A * | 12/1997 | Pickles | ................... | H04Q 1/06 |
| | | | | 211/175 |
| 6,106,329 A * | 8/2000 | Baker, III | ............. | H02B 1/202 |
| | | | | 439/532 |
| 7,702,207 B2 * | 4/2010 | Adomeit | ............. | G02B 6/4452 |
| | | | | 385/136 |

(Continued)

FOREIGN PATENT DOCUMENTS

WO     2007117531 A1    10/2007

OTHER PUBLICATIONS

Harsh Environment Interconnect, Catal ogue Edition 2.1, Senko Advanced Components, Inc., 17 pages (acknowledged as prior art as of Jan. 9, 2020).

(Continued)

*Primary Examiner* — Christopher Garft
(74) *Attorney, Agent, or Firm* — Merchant & Gould P.C.

(57) ABSTRACT

A connection interface includes a base bracket and a cable connection carrier (e.g., module, panel, etc.). The cable connection carrier has a front wall to which one or more cable connection components (e.g., optical components, electrical components, and/or hybrid components) are mounted. The cable connection carrier may angle the cable connection components relative to an open front of the base bracket. Some cable connection carriers may be snap-fit to the base bracket for easy installation. Other cable connection carriers are movable (e.g., pivotal) relative to the base bracket.

18 Claims, 38 Drawing Sheets

(56) References Cited

U.S. PATENT DOCUMENTS

| | | | |
|---|---|---|---|
| 7,704,102 B2* | 4/2010 | Nad | H01R 9/26 439/94 |
| 9,477,049 B2 | 10/2016 | Gniadek et al. | |
| 10,396,512 B2 | 8/2019 | Gniadek | |
| 10,473,866 B2 | 11/2019 | Newbury et al. | |
| 2003/0022552 A1* | 1/2003 | Barker | H04Q 1/06 439/540.1 |
| 2005/0281526 A1 | 12/2005 | Vongseng et al. | |
| 2006/0093303 A1 | 5/2006 | Reagan et al. | |
| 2006/0217004 A1* | 9/2006 | Adomeit | H04Q 1/142 439/719 |
| 2007/0196071 A1* | 8/2007 | Laursen | G02B 6/3897 385/135 |
| 2009/0163043 A1* | 6/2009 | Demers | H04Q 1/062 439/43 |
| 2010/0220967 A1* | 9/2010 | Cooke | G02B 6/4452 385/135 |
| 2013/0108227 A1* | 5/2013 | Conner | G02B 6/4471 385/101 |
| 2013/0134115 A1* | 5/2013 | Hernandez-Ariguznaga | H05K 7/186 211/26 |
| 2014/0037259 A1 | 2/2014 | Bragg | |
| 2014/0185992 A1* | 7/2014 | Castonguay | G02B 6/36 385/88 |
| 2015/0219865 A1* | 8/2015 | Timmins | G02B 6/3897 385/135 |
| 2018/0196204 A1* | 7/2018 | Agata | G02B 6/4452 |
| 2021/0021062 A1* | 1/2021 | Henke | H01R 9/2683 |

OTHER PUBLICATIONS

International Search Report and Written Opinion for Application No. PCT/US2021/012751 dated Apr. 29, 2021.

* cited by examiner

CONNECTION INTERFACE

CROSS-REFERENCE TO RELATED APPLICATION

This application is a continuation of U.S. patent application Ser. No. 17/144,659, filed Jan. 8, 2021, which claims the benefit of U.S. Provisional Application No. 62/959,468, filed Jan. 10, 2020, and titled "Connection Interface" the disclosure of which is hereby incorporated herein by reference.

BACKGROUND

Antenna towers are increasingly used in communications network to provide cellular or other wireless services. Remote radio heads (RRH) coupled to or integrated with the antennas at the top of the towers transmit signals through the antennas. Typically, a feeder cable is routed up the tower to the RRH from a network base station at the bottom of the tower. The feeder cable carries transmission signals and optionally power between the base station and the RRH.

Increasingly, the antenna towers are part of a Fiber to the Antenna (FTTA) network—the feeder cable is an optical cable including optical fibers carrying optical signals to the RRH. In some cases, each RRH receives a separate feeder cable (e.g., a hybrid cable). In certain cases, each RRH receives a separate signal feeder cable (e.g., an optical cable) and a separate power cable (e.g., a coaxial cable). In other cases, a common cable (e.g., a hybrid cable) can be routed up the tower and separated near the top of the tower into pigtails or additional cables routed to the respective RRH.

Improvements are desired.

SUMMARY

Some aspects of the disclosure are directed to a connection interface suitable for managing cables at the top of an antenna tower in a FTTA network. For example, a connection interface may receive and manage one or more feeder cables routed up an antenna tower. The connection interface also may provide for connections between the one or more feeder cables and one or more additional cables routed from the connection interface to the RRH.

In accordance with certain aspects of the disclosure, example connection interfaces include a base bracket and one or more cable connection carriers (e.g., one or more cable connection modules, a cable connection panel, etc.). Each connection carrier holds one or more cable connection components. Each cable connection component includes structure to align and couple (e.g., optically couple and/or electrically couple) together two or more cables. In certain implementations, each cable connection component includes a front mating port for receiving a first cable and a rear mating port for receiving a second cable. In certain examples, each cable connection component includes alignment structure for aligning a ferrule or other terminating structure of the cable.

In certain implementations, the base bracket has a front and a back. The base bracket includes a base wall defining the back of the base bracket and first and second opposite base bracket side walls that project forwardly from the base wall to the front of the base bracket.

In certain implementations, a cable connection module has a front wall to which a plurality of cable connection components are mounted. The cable connection module also includes opposite first and second legs that project rearwardly from the front wall. The base bracket defines a module mounting location between the first and second base bracket side walls for receiving the cable connection module. The cable connection module is inserted into the module mounting location through the front of the base bracket.

In certain examples, the cable connection module is secured to the base bracket at the mounting location by a snap-fit interface.

In certain examples, the first and second opposite base bracket side walls respectively define first and second receptacles at the module mounting location for respectively receiving the first and second legs of the cable connection module.

In certain examples, the cable connection components include fiber optic adapters. In an example, each of the fiber optic adapters includes a first end for mating with a first fiber optic connector and a second end for mating with a second fiber optic connector, and first and second fiber optic connectors are sealed with respect to the fiber optic adapters when mated therewith. In an example, the first and second fiber optic connectors are single-fiber connectors each having a single fiber ferrule, or duplex connectors each having two single-fiber ferrules, or multi-fiber ferrules each having a multi-fiber ferrule.

In certain examples, the front wall of the cable connection module is oriented at an oblique angle relative to a front reference plane defined at a front of the base bracket when the cable connection module is mounted at the module mounting location. In an example, when the cable connection module is mounted at the module mounting location the front reference plane intersects the front wall such a rearward portion of the front wall is rearward of the front reference plane and between the base bracket side walls and a forward portion of the front wall is in front of the front reference plane and in front of the front of the base bracket.

In certain examples, the base bracket includes a plurality of base bracket modules that are stacked together to form the base bracket, and each of the base bracket modules defines a separate one of the module mounting locations. In certain examples, a plurality of base brackets can be laterally coupled together. In certain examples, stacks of base bracket modules can be laterally coupled together. In an example, the base bracket modules can be added in the field over time to increase the capacity of the connection interface.

In certain implementations, the base bracket has a front and a back. The base bracket includes a base wall defining the back of the base bracket and first and second opposite base bracket side walls that project forwardly from the base wall to the front of the base bracket. The base bracket defines a width that extends between the first and second opposite base bracket side. The base bracket defines a length that is parallel to the first and second opposite base bracket side walls. The length of the base bracket extends between opposite first and second ends of the base bracket. The base bracket defines a cable entrance location at the first end.

In certain implementations, a cable connection panel pivotally connects to the bracket side walls of the base bracket at a pivot axis at the first end of the base bracket. The cable connection panel is moveable relative to the base bracket about the pivot axis between an open position and a closed position. The cable connection panel covers the front of the base bracket when in the closed position. One or more cable connection components are mounted to the cable connection panel.

In certain examples, the cable connection components are arranged in rows. In an example, the rows extend across the width of the base bracket when the cable connection panel is in the closed position.

In certain examples, the cable connection panel latches to the base bracket adjacent the second end of the base bracket when the cable connection panel is in the closed position.

In certain examples, the cable connection panel has a stepped configuration with component mounting surfaces that are oriented at an oblique angle relative to the front of the base bracket when the cable connection panel is in the closed position.

In certain examples, the cable connection components include front ends positioned at a front side of the cable connection panel and rear ends positioned at a rear side of the cable connection panel. The cable connection components are oriented with axes aligned at oblique angles relative to the front of the base bracket when the cable connection panel is in the closed position. When the cable connection panel is in the closed position, the rear ends of the cable connection components face at least partially toward the first end of the base bracket and the front ends of the cable connection components face at least partially toward the second end of the base bracket.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 20:
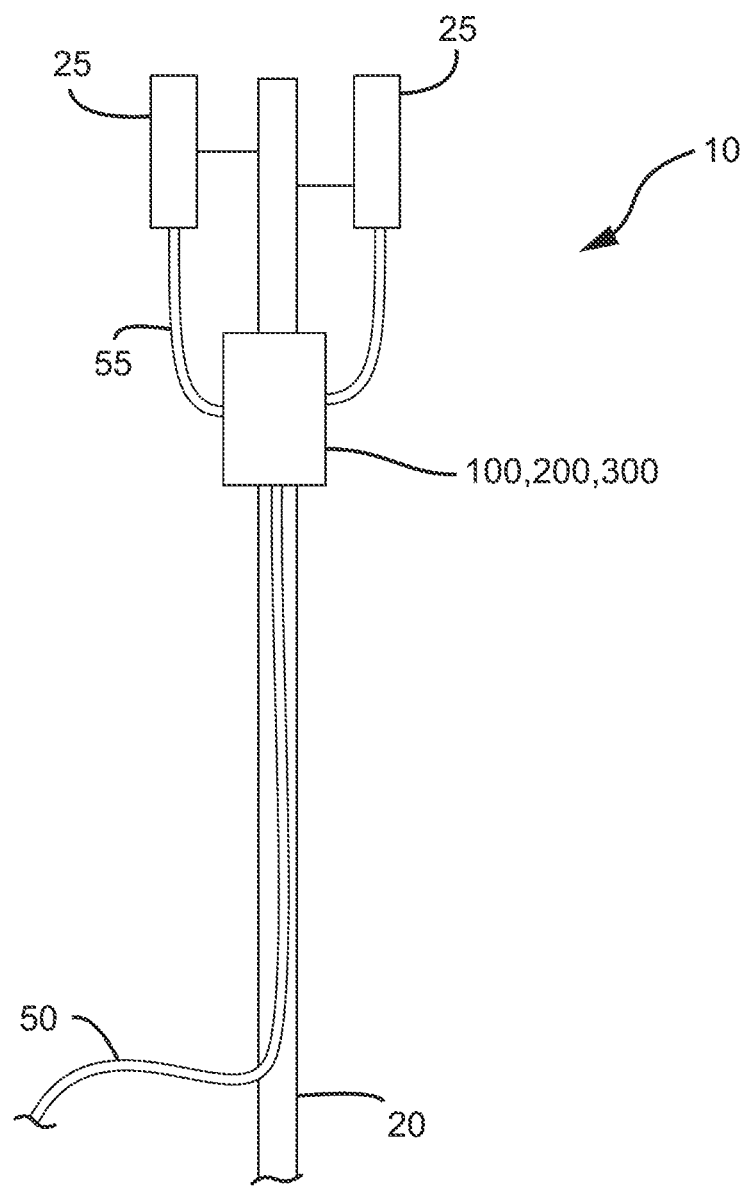
FIG. 20 is a schematic representation of an antenna tower site in a communications network having example aspects in accordance with the principles of the present disclosure.
Figure 21:
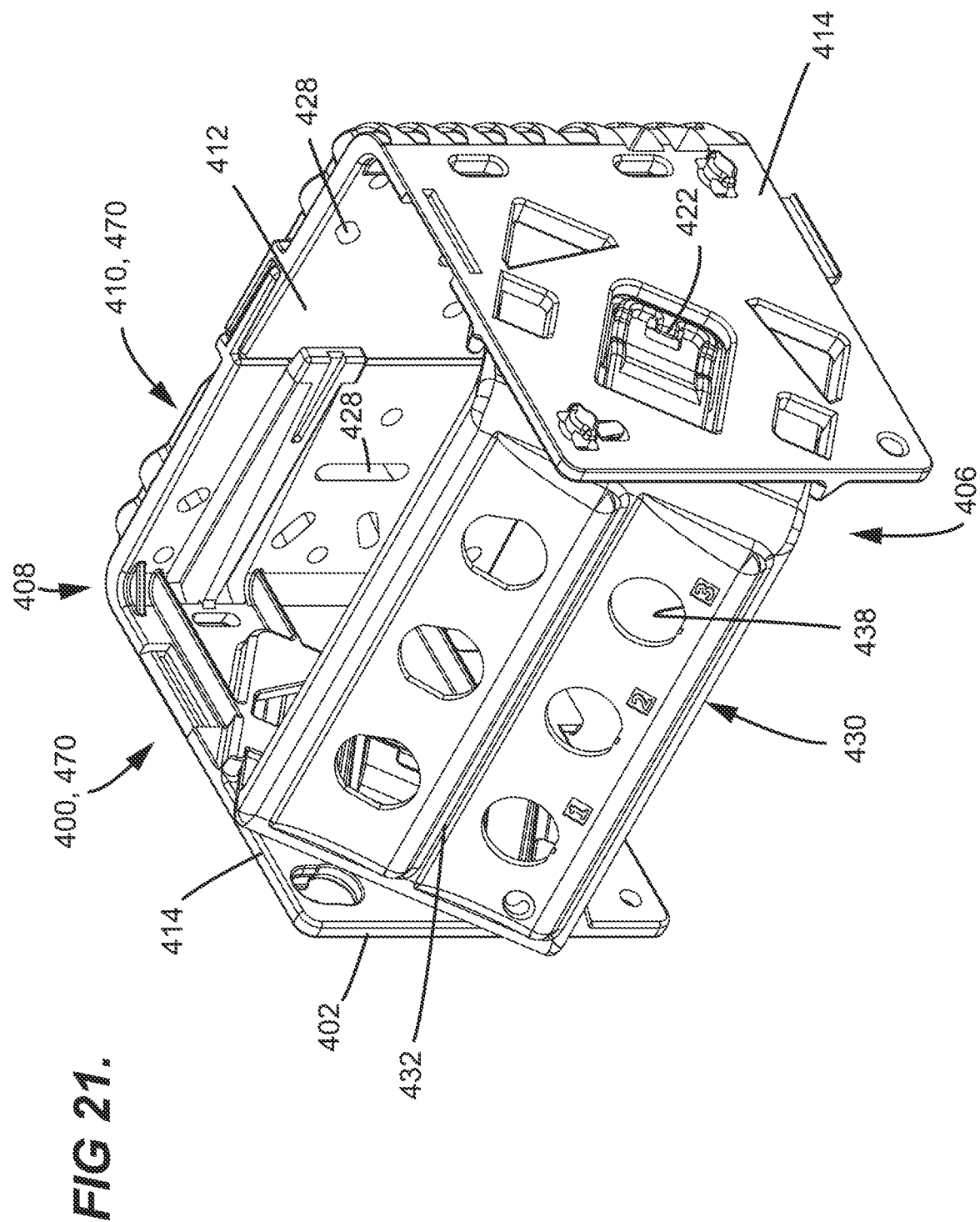
FIG. 21 is a top, front perspective view of a fourth example connection interface configured in accordance with the principles of the present disclosure, the fourth connection interface including a base bracket and a cable connection carrier mounted thereto.
Figure 22:
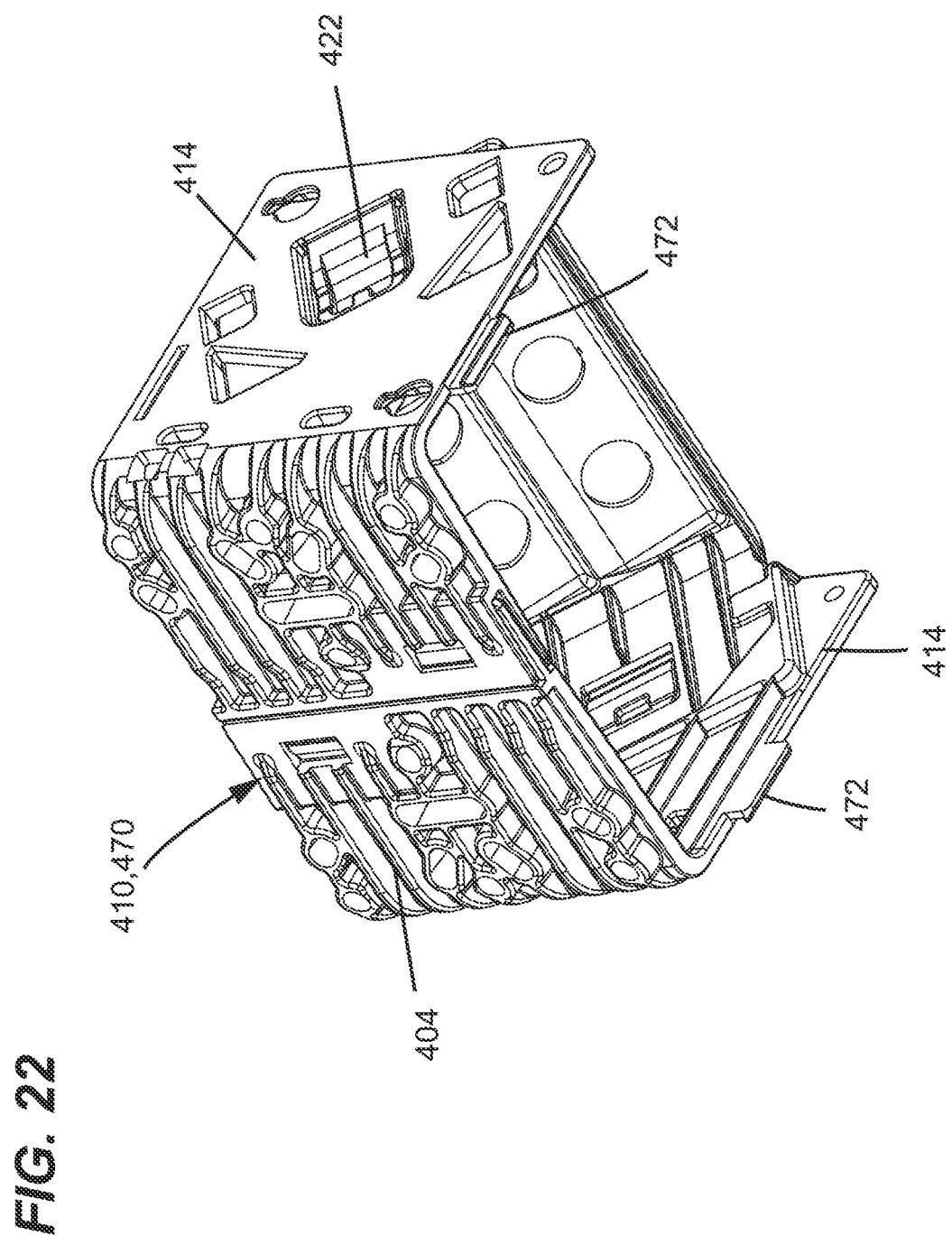
FIG. 22 bottom, rear perspective view of the connection interface of FIG. 21.
Figure 23:
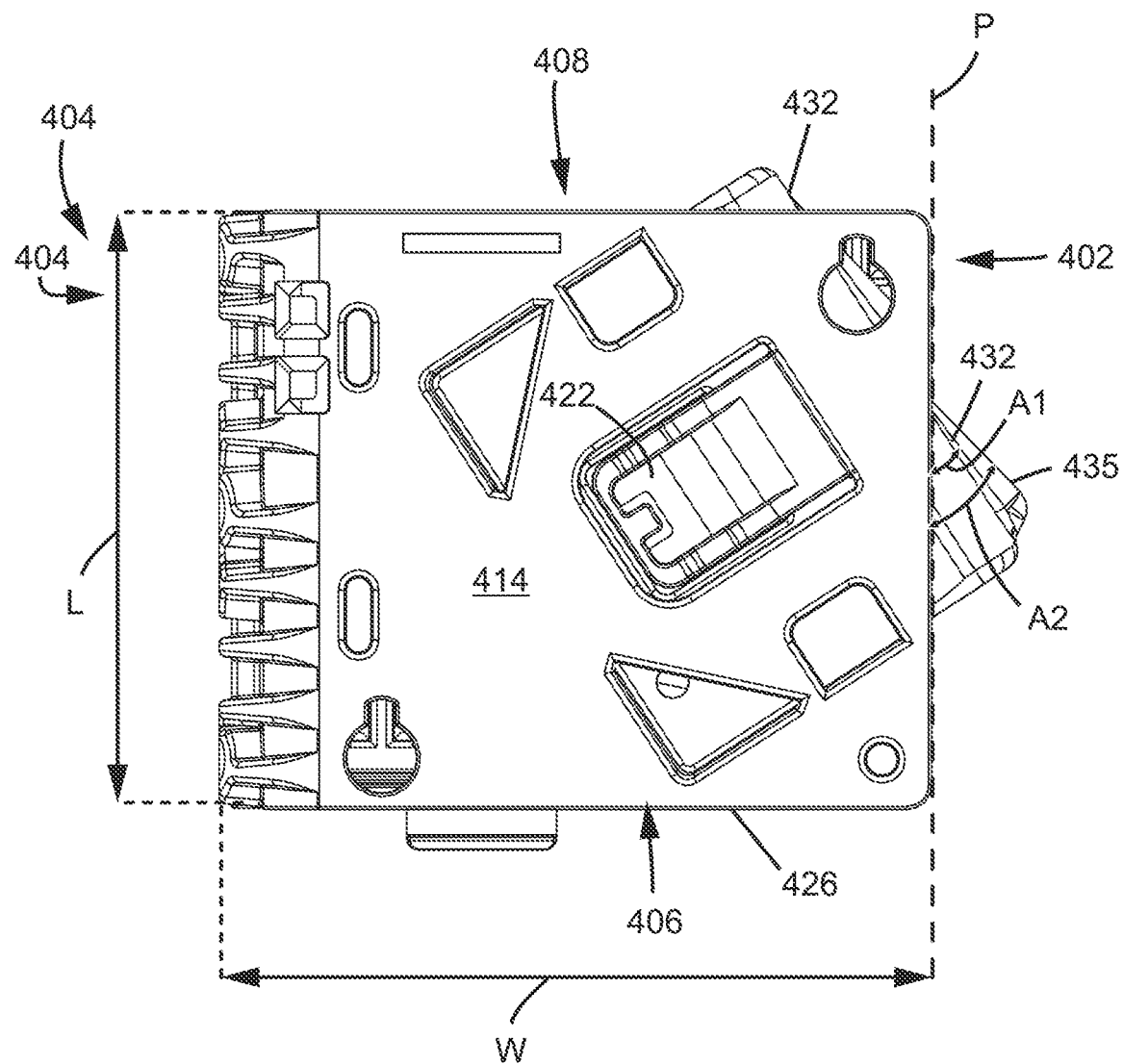
FIG. 23 is a side elevational view of the connection interface of FIG. 21.
Figure 24:
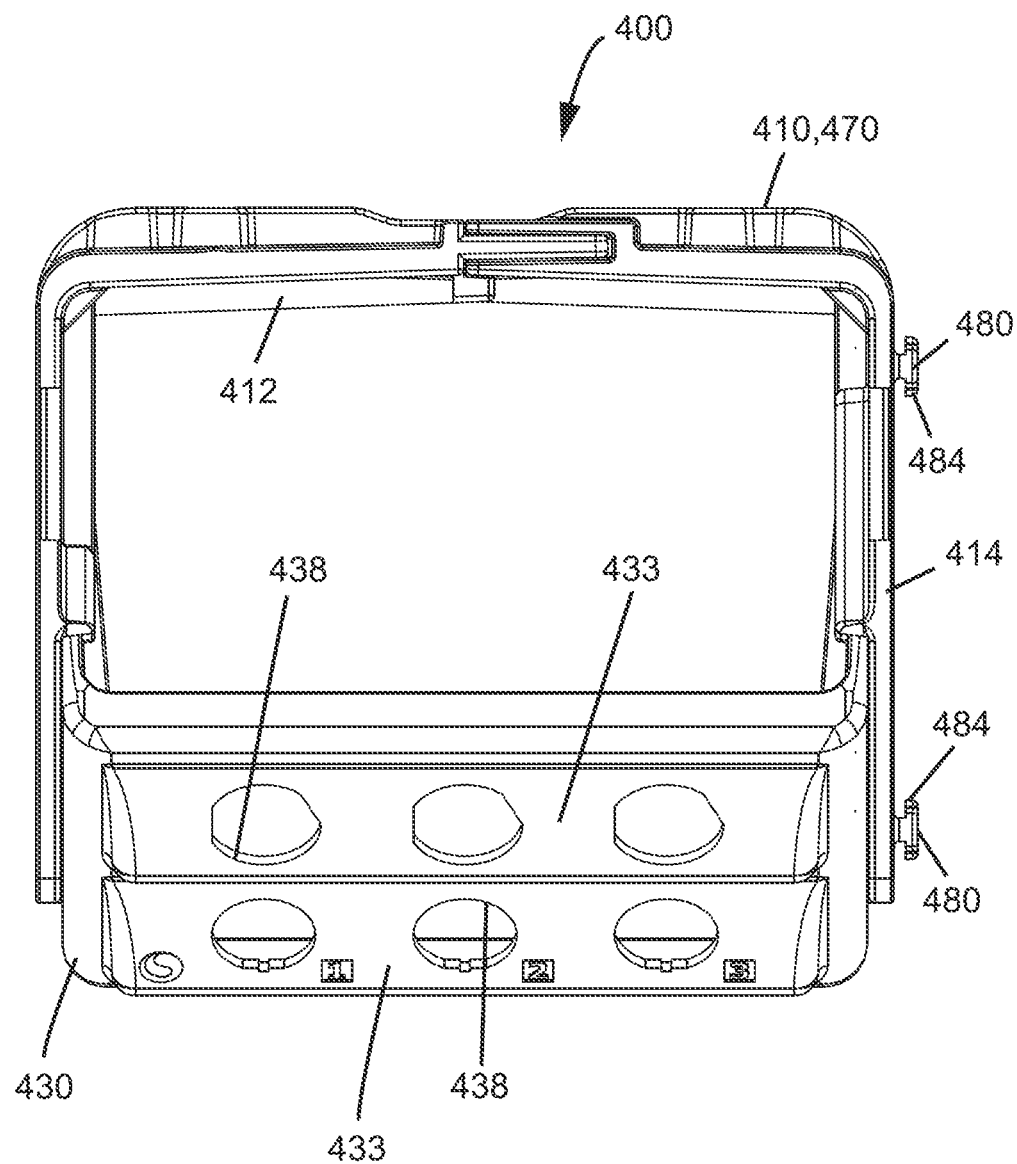
FIG. 24 is a top plan view of the connection interface of FIG. 21.
Figure 25:
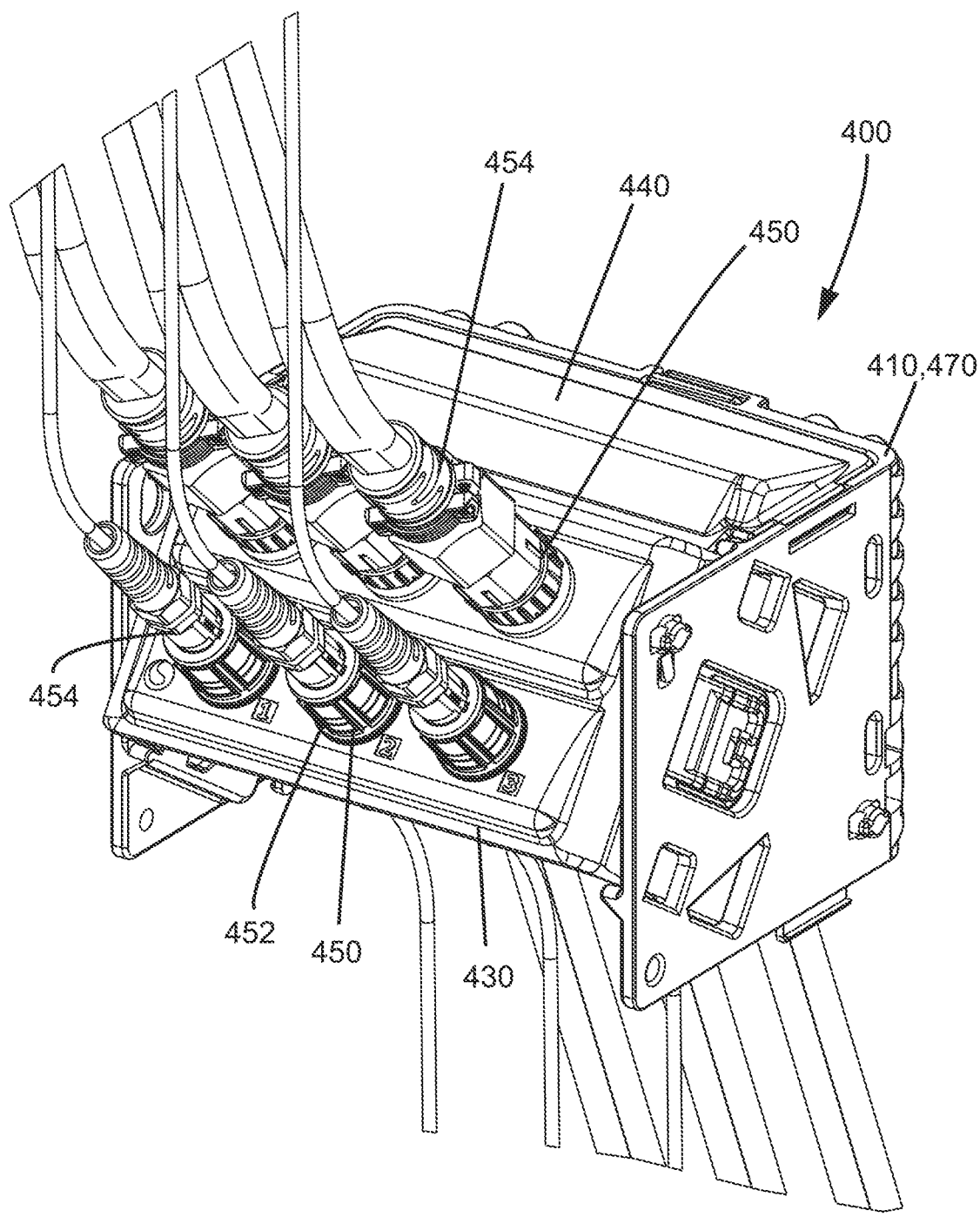
FIG. 25 is a top, front perspective view of the connection interface of FIG. 21 shown holding a row of power couplings at which power cables are interfaced together and another row of optical adapters at which optical cables are interfaced together.
Figure 26:
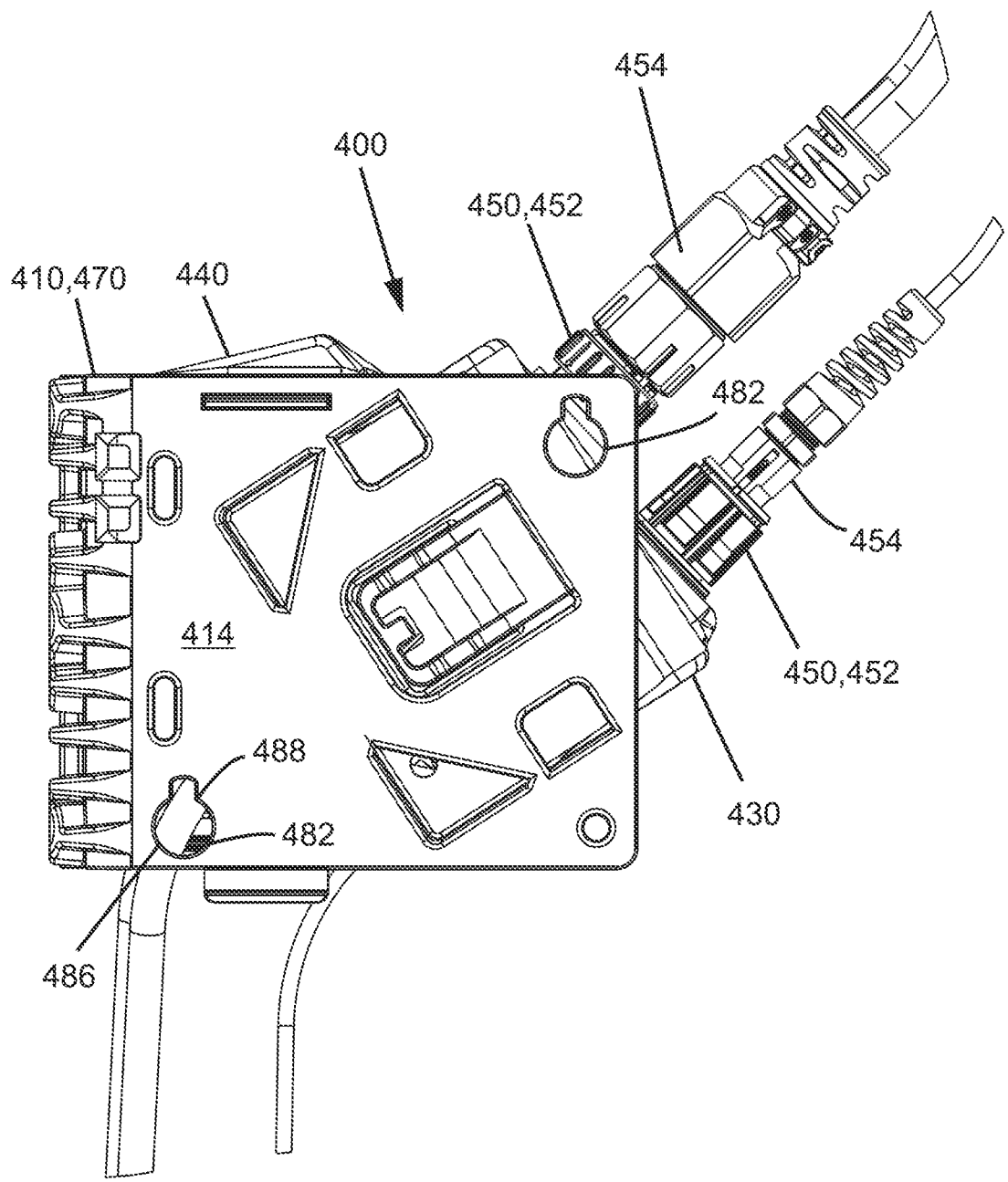
FIG. 26 is a side elevational view of the connection interface of FIG. 25.
Figure 27:
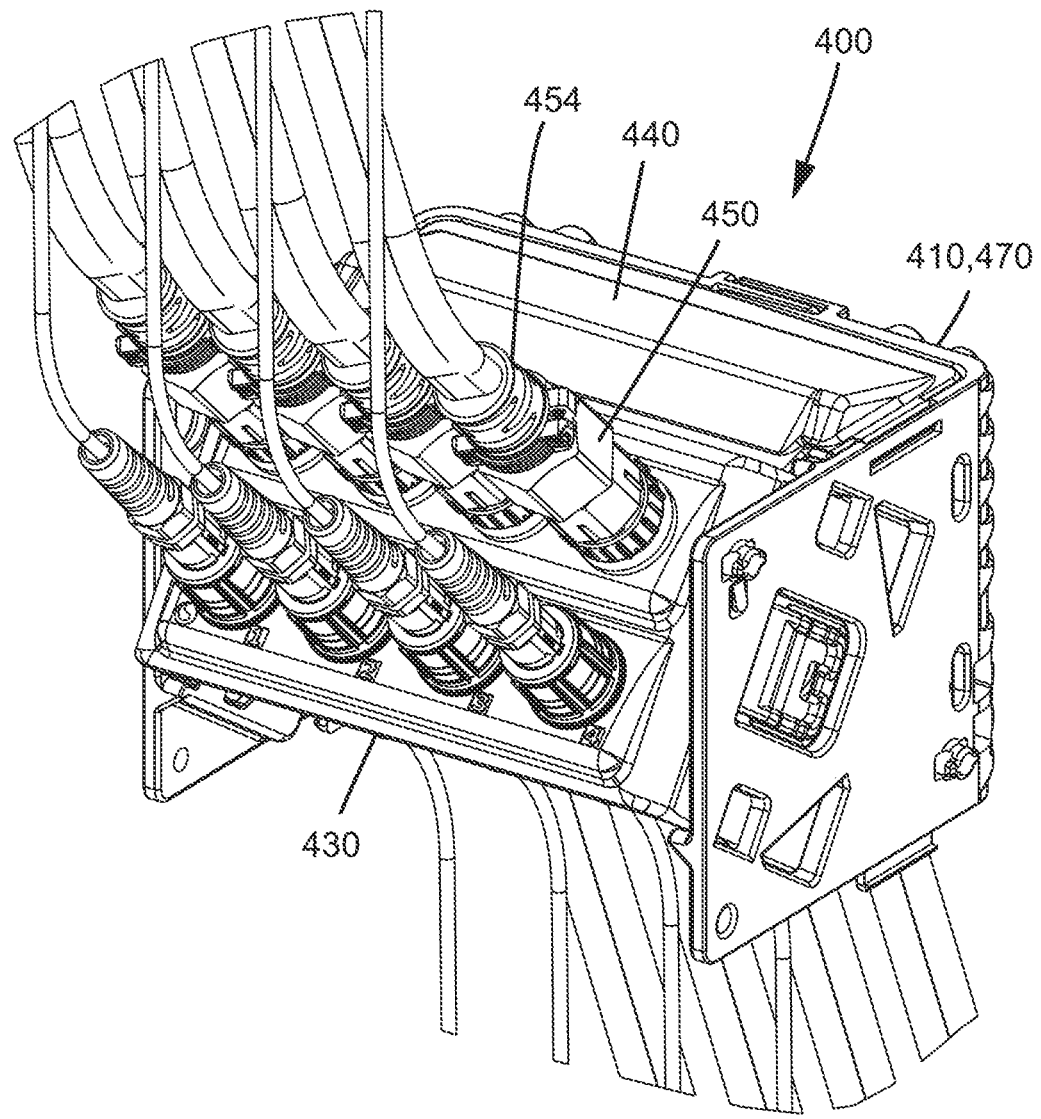
FIG. 27 is a top, front perspective view of the connection interface of FIG. 21 shown holding a row of power couplings at which power cables are interfaced together and another row of optical adapters at which optical cables are interfaced together, each of the rows holding more components than the rows of the connection interface of FIG. 25.

The present disclosure is directed to a connection interface 100, 200, 300, 400. In certain implementations, the connection interface 100, 200, 300, 400 is suitable for use in managing cables on an antenna tower in a FTTA network. FIG. 20 illustrates an example antenna tower site 10 in a communications network, such as a FTTA network. The site 12 includes an antenna tower 20 at which one or more antennas and one or more RRH 25 can be mounted. Each RRH 25 is adapted to transmit and receive signals to and from devices (e.g., mobile phones, smart-phones, devices with wireless interne connectivity, etc.) of subscribers to the communications network. In certain examples, the RRH 25 may be integrated into the antennas.

In certain examples, one or more of the connection interfaces 100, 200, 300, 400 shown and described herein are mounted to the antenna tower 20. One or more feeder cables 50 (e.g., fiber optic cables, electrical cables, hybrid cables) extend between the connection interface(s) 100, 200, 300, 400 and a network base station. One end of the one or more cables 50 engages inner/rear ports of the cable connection components 150, 250, 350, 450 of the connection interface(s) 100, 200, 300, 400. Additional cables 55 connect each RRH 25 to outer/front ports of the cable connection components 150, 250, 350, 450 of the connection interface(s) 100, 200, 300, 400.

In accordance with some aspects of the disclosure, the additional cables can be routed from the RRH to the connection interface 100, 200, 300, 400 during an initial installation of the RRH, even if a feeder cable has not yet been routed to the antenna tower. Subsequently, one or more feeder cables can be routed up the antenna tower to the connection interface 100, 200, 300, 400 to connect to the additional cables. Accordingly, such a design reduces the amount of cable routing performed on the antenna tower during subsequent feeder cable installations. Of course, the connection interface 100, 200, 300, 400 can be used at other positions in a communications network.

Referring to FIGS. 1-19, the connection interface 100, 200, 300, 400 includes a base bracket 110, 210, 310, 410 and a cable connection carrier 130, 230, 330, 430. The cable connection carrier 130, 230, 330, 430 has a front wall 132, 232, 332, 432 to which a plurality of cable connection components 150, 250, 350, 450 are mounted. In some implementations, the cable connection components 150, 250, 350, 450 include connection interfaces for optical cables. In other implementations, the cable connection components 150, 250, 350, 450 include connection interfaces for electrical cables. In other implementations, the cable connection components 150, 250, 350, 450 include connection interfaces for hybrid cables.

In some implementations, the cable connection components 150, 250, 350, 450 include receptacles to receive plug connectors. For example, the cable connection components 150, 250, 350, 450 may include fiber optic adapters 152, 252, 352, 452. In other examples, the cable connection components 150, 250, 350, 450 include plug connectors (e.g., optical plug connectors, electrical plug connectors, hybrid plug connectors, etc.), optical cable fanouts, splice holders for optical and/or electrical splices, or other such cable interfaces.

In certain examples, each of the fiber optic adapters 152, 252, 352, 452 includes a first end for mating with a first fiber optic connector 154, 254, 354, 454 and a second end for mating with a second fiber optic connector 154, 254, 354, 454. In certain examples, the mating ends of the fiber optic adapters 152, 252, 352, 452 include twist-to-lock arrangements (e.g., bayonets, threads, etc.) or other lock arrangements for securing first and second fiber optic connectors 154, 254, 354, 454 thereat. In some examples, both mating ends of a fiber optic adapter 152, 252, 352, 452 include the same type of twist-to-lock arrangement. In other examples, each mating end of a fiber optic adapter 152, 252, 352, 452 has a different twist-to-lock arrangement (e.g., one end is threaded and the other has a bayonet interface). In certain examples, first and second fiber optic connectors 154, 254, 354, 454 are sealed with respect to the fiber optic adapters 152, 252, 352, 452 when mated therewith.

In some examples, the first and second fiber optic connectors 154, 254, 354, 454 are single-fiber connectors each having a single fiber ferrule. In other examples, the first and second fiber optic connectors 154, 254, 354, 454 are duplex connectors each having two single-fiber ferrules. In other examples, the first and second fiber optic connectors 154, 254, 354, 454 are multi-fiber ferrules each having a multi-fiber ferrule.

Some example cable connection components suitable for use with the connection interfaces 100, 200, 300, 400 are shown and described in U.S. Pat. Nos. 9,477,049; 10,396, 512; and 10,473,866, the disclosures of which are hereby incorporated herein by reference in their entirety.

Referring now to FIGS. 3, 10, 17, and 33, the base bracket 110, 210, 310, 410 includes a base wall 112, 212, 312, 412 defining a back 104, 204, 304, 404 of the base bracket 110, 210, 310, 410. First and second opposite base bracket side walls 114, 214, 314, 414 project forwardly from the base wall 112, 212, 312, 412 to a front 102, 202, 402 of the base bracket 110, 210, 310, 410. In certain implementations, the base wall 112, 212, 312, 412 and the base bracket side walls 114, 214, 314, 414 cooperate to define a c-shaped configuration, u-shaped configuration, or w-shaped configuration when viewed from an end 106, 108, 206, 208, 306, 308, 406, 408 of the base bracket 110, 210, 310, 410. The front 102, 202, 302, 402 of the base bracket 110, 210, 310, 410 is open.

The base bracket 110, 210, 310, 410 defines a width W that extends between the first and second opposite base bracket side walls 114, 214, 314, 414. The base bracket 110, 210, 310, 410 defines a length that is parallel to the first and second opposite base bracket side walls 114, 214, 314, 414. The length of the base bracket 110, 210, 310, 410 extends between opposite first and second ends 106, 108, 206, 208, 306, 308, 406, 408 of the base bracket 110, 210, 310, 410. The base bracket 110, 210, 310, 410 defines a cable entrance location 126, 226, 326, 426 at the first end 106, 206, 306, 406.

Figure 30:
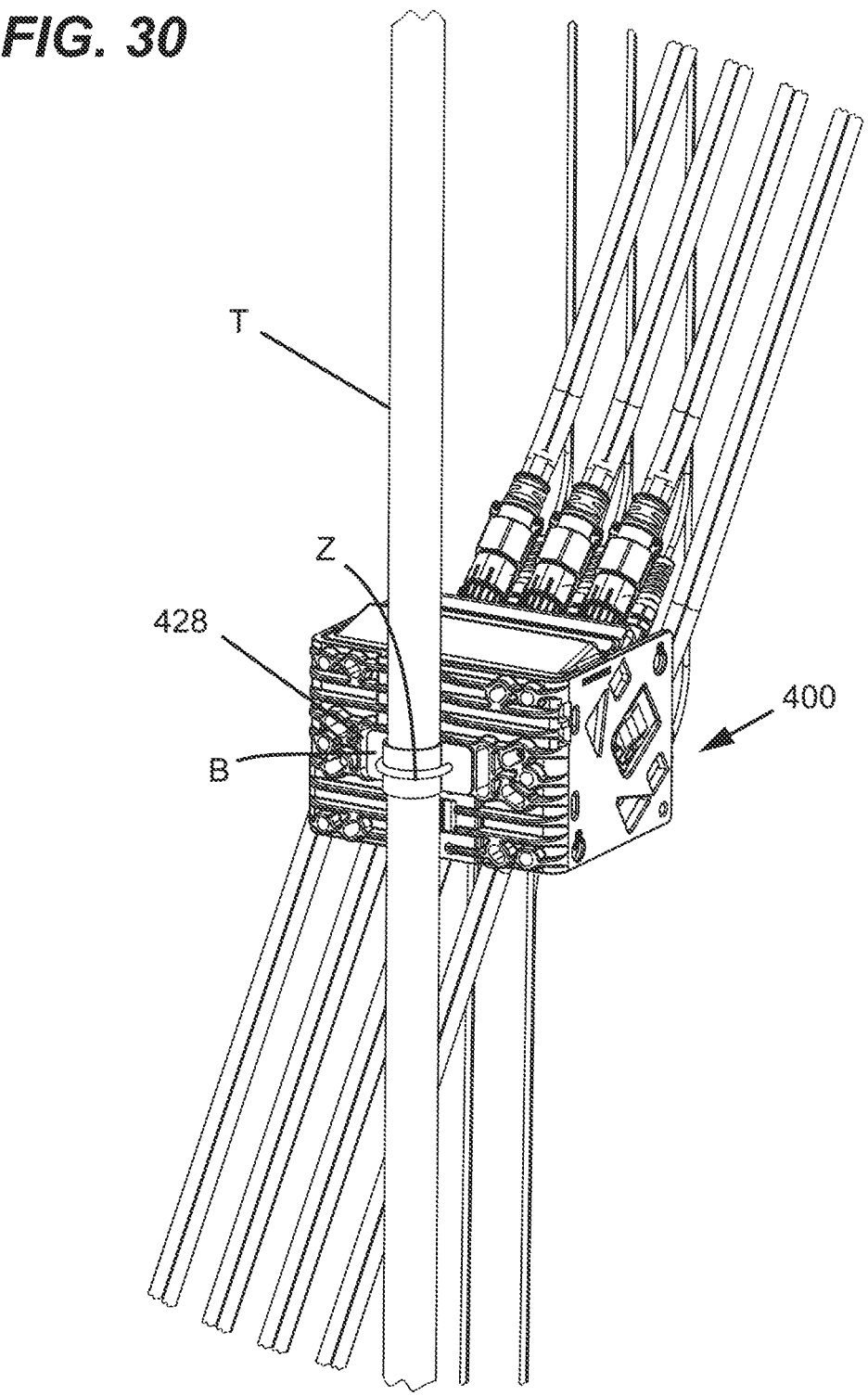
FIG. 30 is a top, rear perspective view of the connection interface of FIG. 21 shown attached to a pole of a first size using a first attachment bracket.
Figure 31:
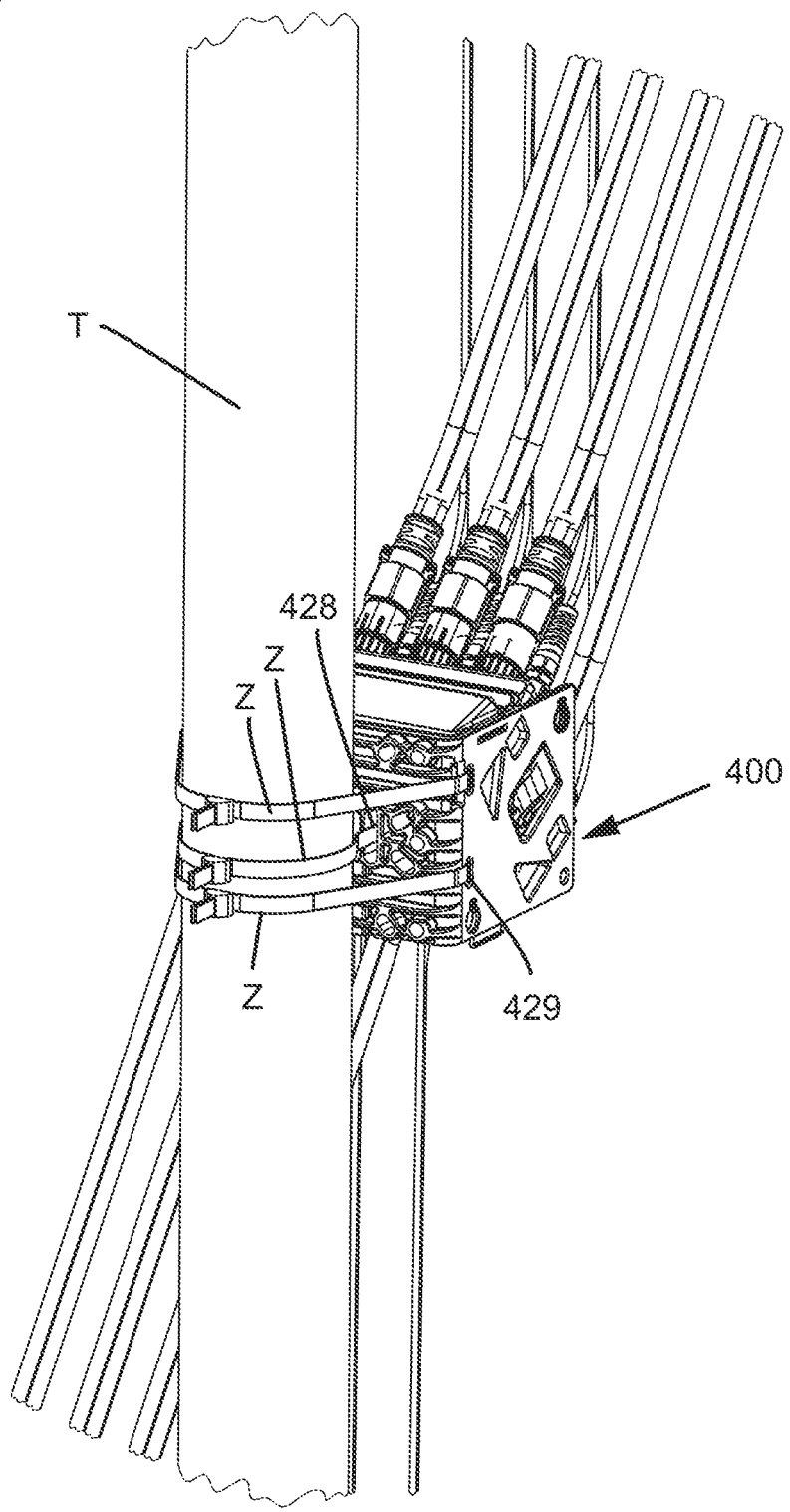
FIG. 31 is a top, rear perspective view of the connection interface of FIG. 21 shown attached to a pole of a second size using a set of straps.
Figure 32:
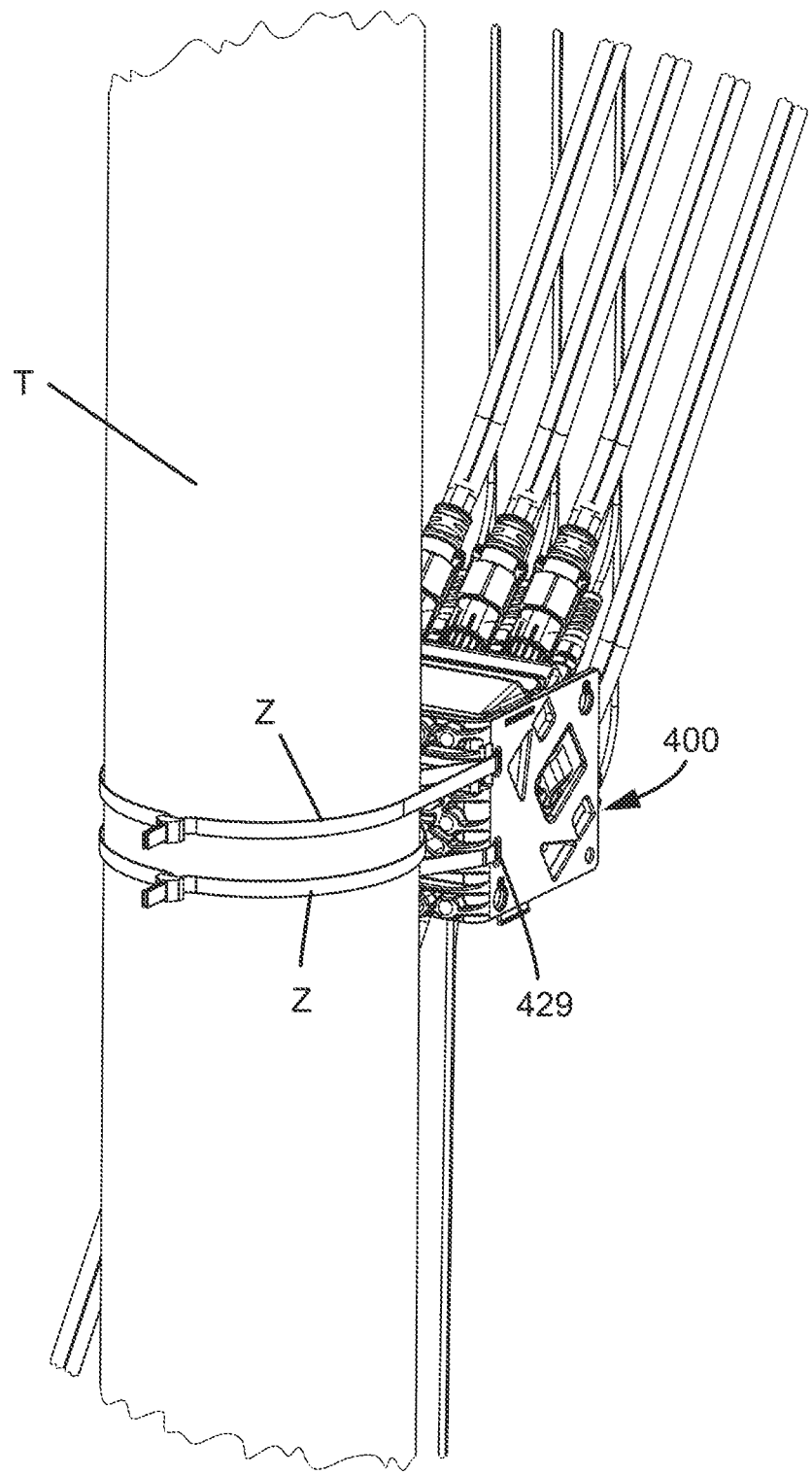
FIG. 32 is a top, rear perspective view of the connection interface of FIG. 21 shown attached to a pole of a third size using another set of straps.

In certain implementations, the base wall 112, 212, 312, 412 includes attachment means for use in attaching the base bracket 110, 210, 310, 410 to another structure, such as a rail R (e.g., FIG. 1), pole T (FIGS. 30-32), wall, or other surface. In certain examples, the attachment means include one or more apertures 128, 228, 328, 428 (see FIGS. 3, 10, 17, and 30) defined through the base wall 112, 212, 312, 412. In other implementations, the attachment means includes apertures 429 defined in the sidewalls 414 of the base bracket 410 (e.g., see FIGS. 31 and 32). In some examples, the apertures 128, 228, 328, 428, 429 include fastener apertures through which screws or other peg-type fasteners can extend. In other examples, the apertures 128, 228, 328, 428, 429 include slots through which a cable tie, zip tie, or other such wrap-style fastener Z can be threaded (e.g., see FIG. 1). In still other examples, the attachment means can include latches, tabs, flanges, or other structures to aid in securing the base wall 112, 212, 312, 412. In certain examples, a bracket B can be mounted to or around the pole T or other surface to a surface and secured to the base bracket 410 to secure the connection interface 400 to the surface.

In certain implementations, the cable connection carrier of some implementations of the connection interface 100, 200, 400 includes one or more cable connection modules 130, 230, 430. In certain implementations, the front wall 132, 232, 432 of each cable connection module 130, 230, 430 defines one or more apertures 138, 238, 438 for receiving one or more of the cable connection components 150, 250, 450. In other implementations, the cable connection components 150, 250, 450 can be otherwise secured to the cable connection module 130, 230, 430.

Each cable connection module 130, 230, 430 also includes opposite first and second legs 134, 234, 434 that project rearwardly from the front wall 132, 232, 432. In certain examples, each leg 134, 234, 434 is cantilevered from the front wall 132, 232, 432. In certain implementations, the front wall 132, 232, 432 and the first and second legs 134, 234, 434 of the cable connection module 130, 230, 430 cooperate to define a c-shaped configuration when viewed from an end of the cable connection module 130, 230, 430. A rear of the cable connection module 130, 230, 430 is open.

The base bracket 110, 210, 410 defines one or more module mounting locations 118, 218, 418 between the first and second base bracket side walls 114, 214, 414 for receiving the one or more cable connection modules 130, 230, 430. Each cable connection module 130, 230, 430 is inserted into a respective module mounting location 118, 218, 418 through the front 102, 202, 402 of the base bracket 110, 210, 410 (e.g., see FIGS. 2, 8, 15, and 33).

In certain implementations, each cable connection module 130, 230, 430 is secured to the base bracket 110, 210, 410 at the mounting location 118, 218, 418 by a snap-fit interface. For example, each side wall 114, 214, 414 may include a flexible finger 122, 222, 422 at each mounting location 118, 218, 418. A free end of each finger 122, 222, 422 includes a stop member 124, 224, 424 that snaps into an aperture 136, 236, 436 defined in the legs 134, 234, 434 of each cable connection module 130, 230, 430. In other examples, the side walls 114, 214, 414 may define apertures and the cable connection modules 130, 230, 430 may include the deflectable stop members. In still other examples, the cable connection modules 130, 230, 430 may otherwise secure to the base bracket 110, 210, 410.

In certain implementations, the first and second opposite base bracket side walls 114, 214, 414 respectively define first and second receptacles 425 at the module mounting location 118, 218, 418 for respectively receiving the first and second legs 134, 234, 434 of the cable connection module 130, 230, 430. In some examples, the first and second receptacles 425 are recessed into the side walls 114, 214, 414 to define channels. In other examples, the first and second receptacles 425 are bounded by guide walls 120, 220, 420 that protrude inwardly from the side walls 114, 214, 414. The guide walls 120, 220, 420 guide the legs 134, 234, 434 from the open front 102, 202, 402 to the mounting locations 118, 218, 418.

In certain implementations, the front wall 132, 232, 432 of the cable connection module 130, 230, 430 is oriented at an oblique angle A1 relative to a front reference plane P (FIG. 5) defined at the front 102, 202, 402 of the base bracket 110, 210, 410 when the cable connection module 130, 230, 430 is mounted at the module mounting location 118, 218, 418. In certain examples, when the cable connection module 130, 230, 430 is mounted at the module mounting location 118, 218, 418, the front reference plane P intersects the front wall 132, 232, 432 such a rearward portion of the front wall 132, 232, 432 is rearward of the front reference plane P and between the base bracket side walls 114, 214, 414 and a forward portion of the front wall 132, 232, 432 is in front of the front reference plane P and in front of the front 102, 202, 402 of the base bracket 110, 210, 410.

In certain implementations, the cable connection module 130, 230, 430 and the base bracket 110, 210, 410 are configured such that the cable connection module 130, 230, 430 is adapted to be inserted into the module mounting location 118, 218, 418 along a linear insert path I (FIG. 2) that is obliquely oriented relative to the front reference plane P. For example, the receptacles 425 define the linear insert path I.

Referring now to FIGS. 7-12 and 21-40, in certain implementations, the base bracket 210, 410 includes multiple base bracket modules 270, 470 that are stacked together to form the base bracket 210, 410. Each of the base bracket modules 270, 470 includes a base wall 212, 412 and an opposite side walls 214, 414 extending forwardly therefrom. The base bracket modules 270, 470 allow the length L of the base bracket 210, 410 to be customized for a particular installation site. Further, one or more base bracket modules 270, 470 can be incrementally added to an existing connection interface 200, 400 over time to increase the capacity of the connection interface 200, 400.

In some implementations, each of the base bracket modules 270, 470 is configured to receive a single one of the cable connection modules 230, 430. For example, each of the base bracket modules 270, 470 defines a separate one of the module mounting locations 218, 418. In other implementations, each of the base bracket modules 270, 470 is configured to receive two or more of the cable connection modules 230, 430. For example, each of the base bracket modules 270, 470 may define multiple module mounting locations 218, 418.

In certain implementations, each of the base bracket modules 270, 470 includes a securement arrangement by which one of the base bracket modules 270, 470 can be secured to another of the base bracket modules 270, 470. In certain examples, each of the base bracket modules 270, 470 includes a latch arm 272, 472 and a catch surface 274, 474. In certain examples, each of the base bracket modules 270, 470 includes a latch arm 272, 472 and a catch surface 274, 474 on each side wall 214, 414. Each latch arm 272, 472 of a base bracket module 270, 470 is configured to engage the catch surface 274, 474 of an adjacent base bracket module 270, 470 to secure the two base bracket modules 270, 470 together. In certain examples, the latch arm 272, 472 extend downwardly from the bottom 206, 406 of the side walls 214, 414 and the catch surfaces 274, 474 are disposed at the top 208, 408 of the side walls 214, 414.

In certain implementations, each of the base bracket modules 270, 470 includes a respective attachment means for use in attaching the base bracket module 270, 470 to another structure, such as a rail R (e.g., FIG. 1), pole, wall (e.g., FIGS. 30-32), or other surface. For example, the base wall 212, 412 of each of the base bracket modules 270, 470 may define apertures 228, 428 (e.g., for peg-type fasteners, for wrap-style fasteners, etc.).

As shown in FIGS. 13-19, the cable connection carrier of other implementations of the connection interface 300 includes a cable connection panel 330 that connects to the bracket side walls 314 of the base bracket 310. The cable connection components 350 are mounted to the cable connection panel 330. In certain implementations, the cable connection components 350 are arranged in one or more rows. In other configurations, the cable connection components 350 can be arranged in columns, arcs, or other patterns.

Figure 1:
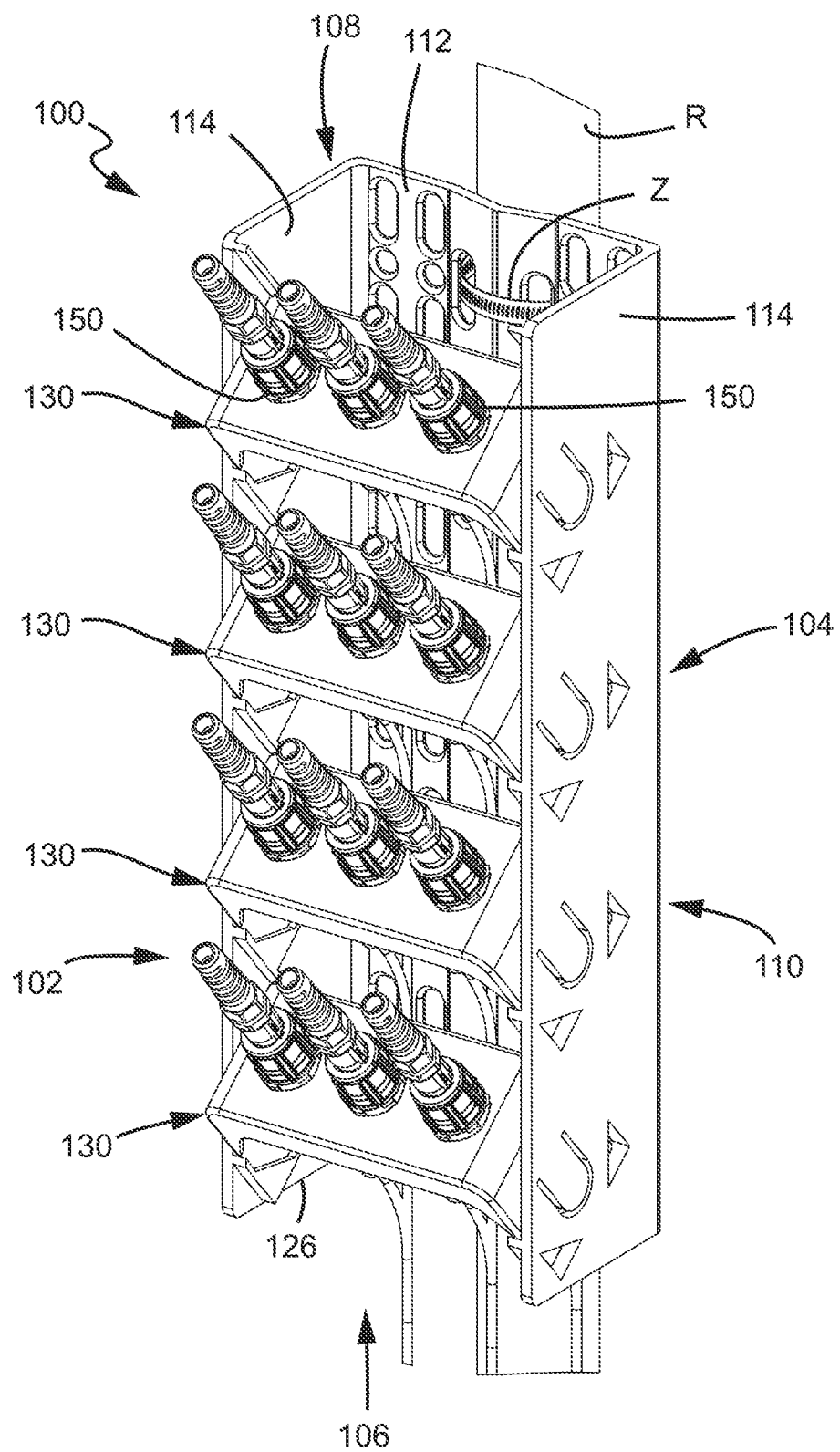
FIG. 1 is a front perspective view of a first example connection interface configured in accordance with the principles of the present disclosure, the first connection interface including a base bracket and at least one cable connection module.
Figure 2:
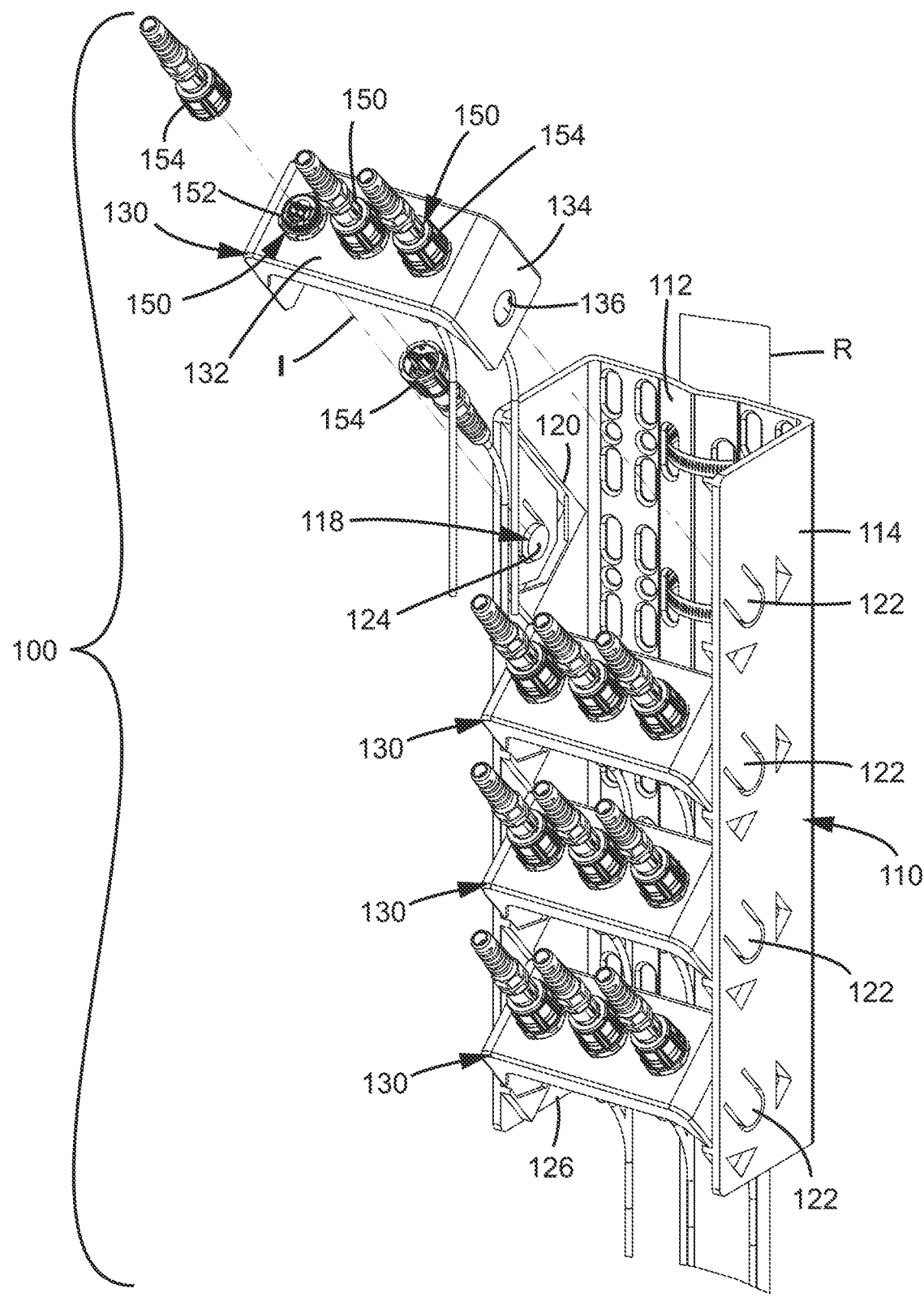
FIG. 2 shows a first cable connection module exploded forwardly of the base bracket of the first connection interface of FIG. 1.
Figure 3:
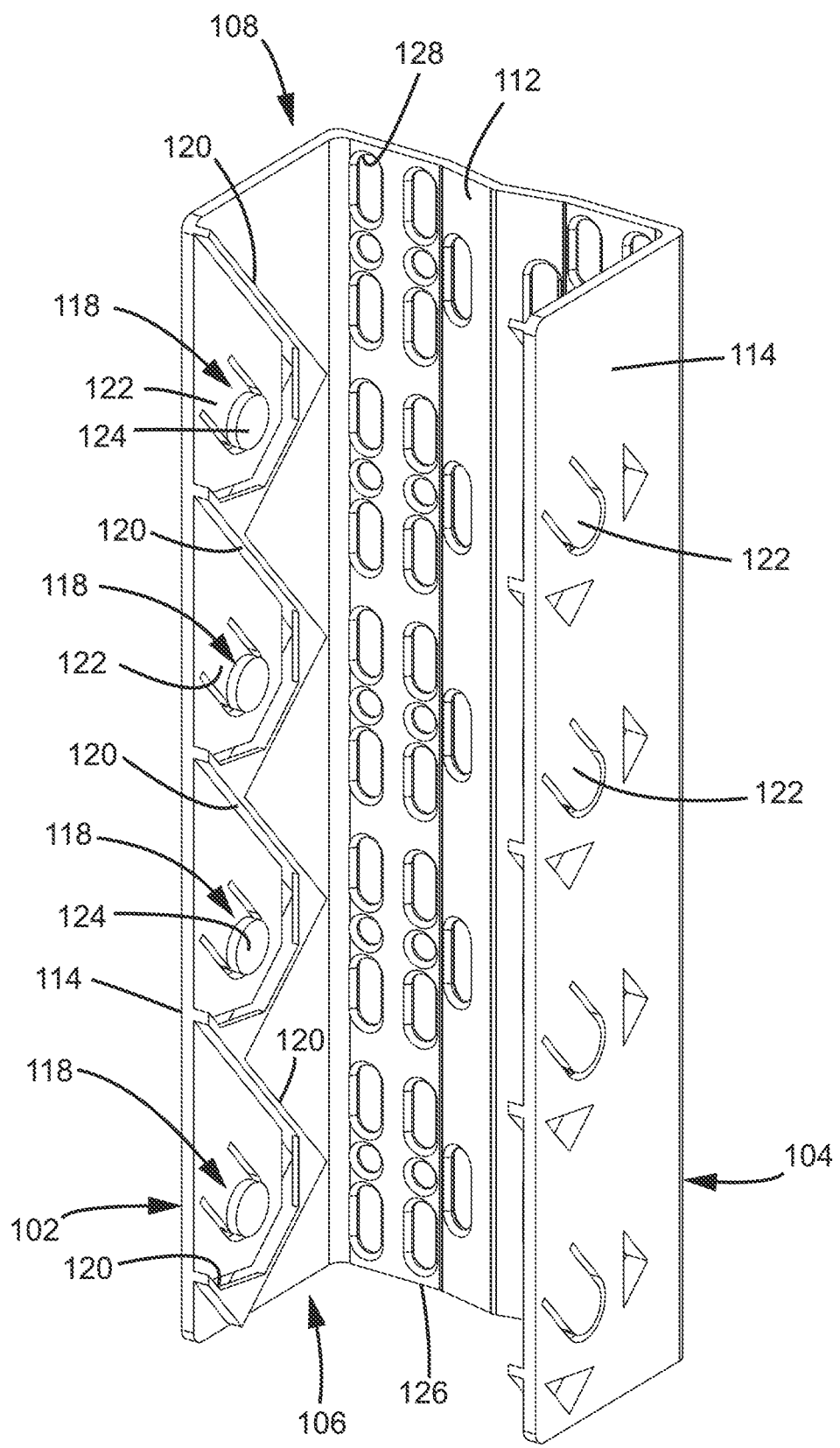
FIG. 3 is a front perspective view of an example base bracket suitable for use with the first connection interface of FIG. 1.
Figure 4:
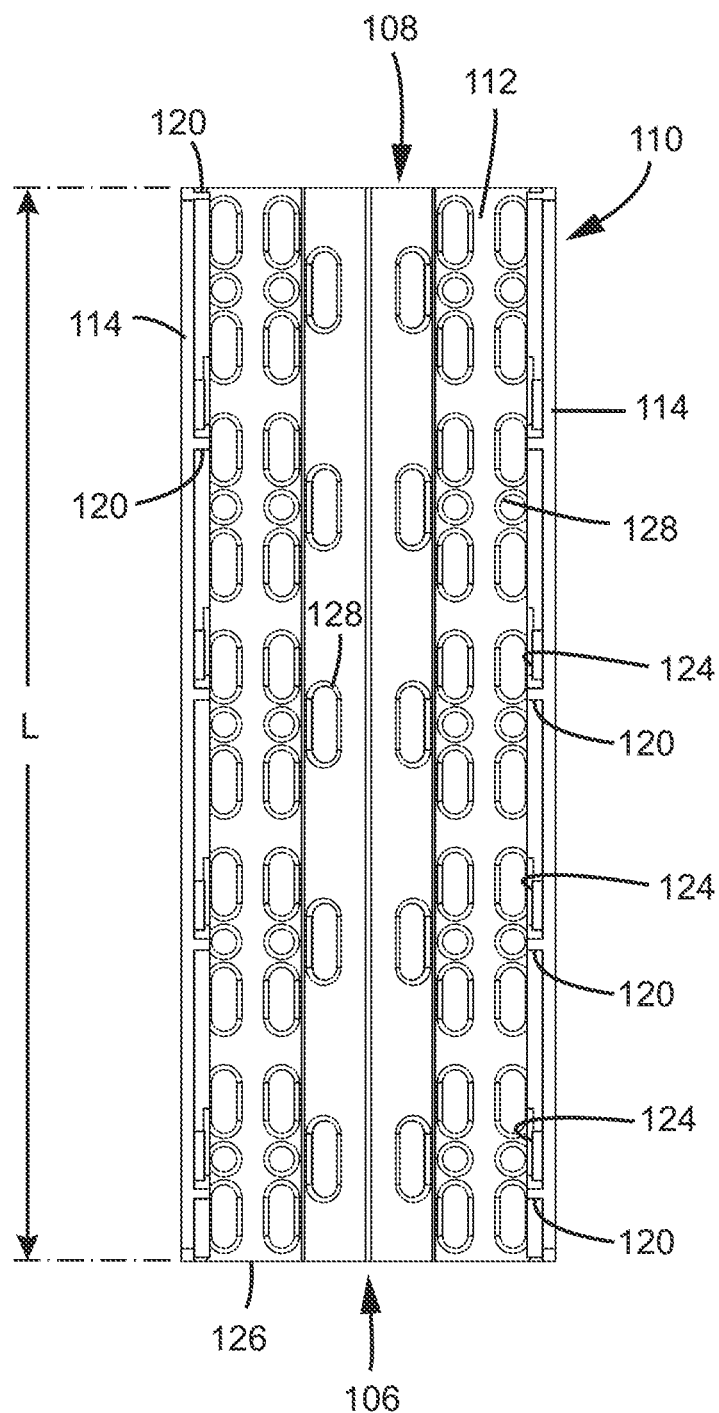
FIG. 4 is a front elevational view of the base bracket of FIG. 3.
Figure 5:
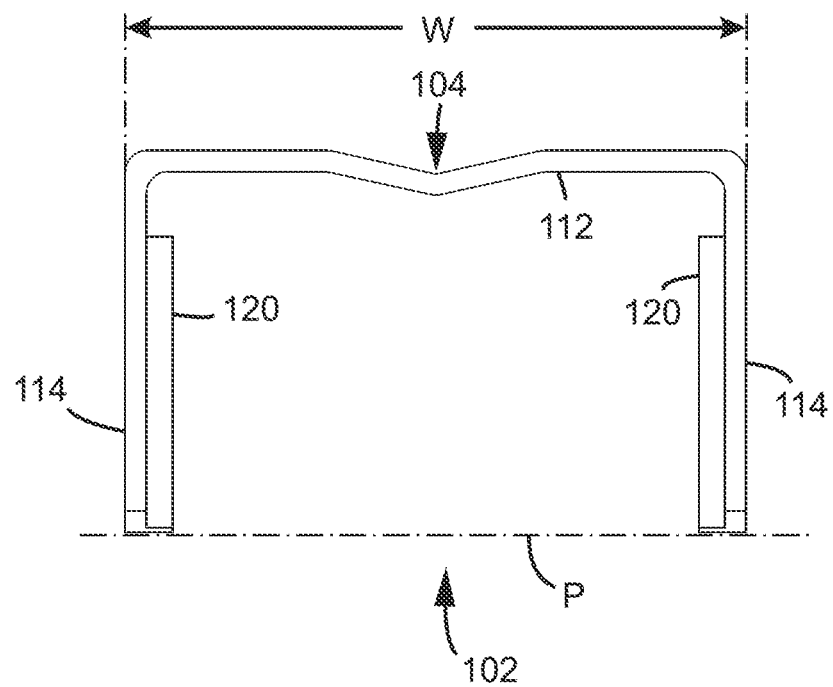
FIG. 5 is a top plan view of the base bracket of FIG. 3.
Figure 6:
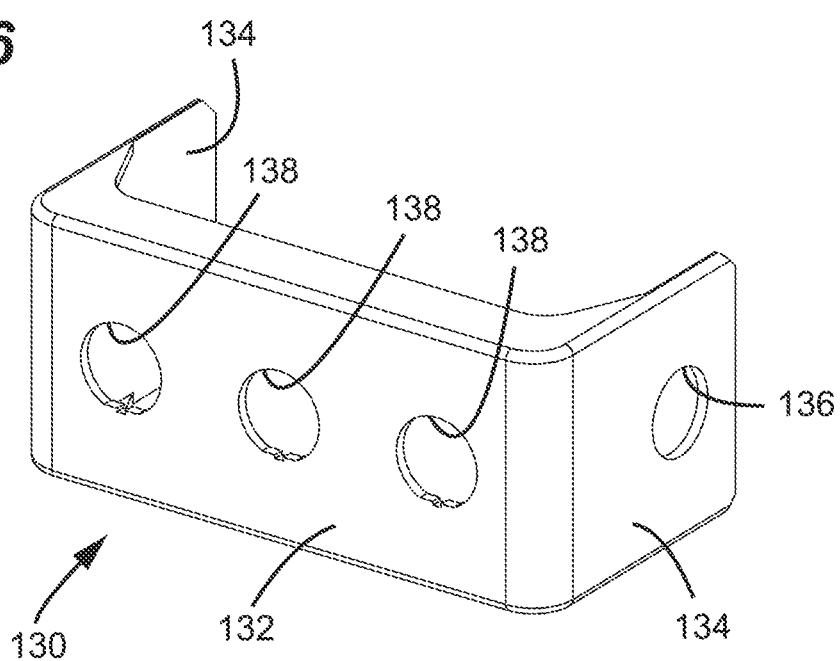
FIG. 6 is a front perspective view of an example cable connection module suitable for use with the first connection interface of FIG. 1.
Figure 7:
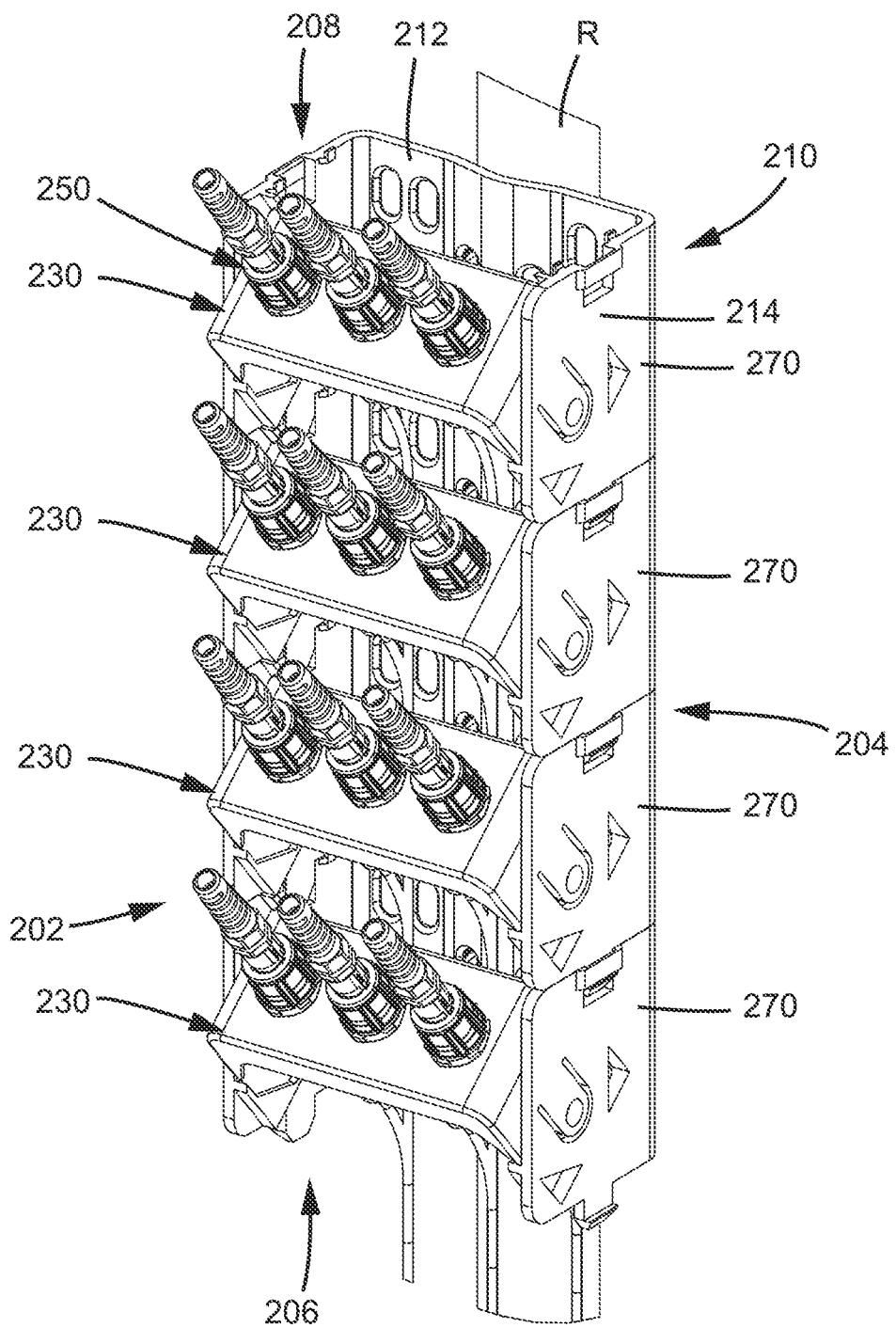
FIG. 7 is a front perspective view of a second example connection interface configured in accordance with the principles of the present disclosure, the second connection interface including a base bracket, which is formed from one or more base bracket modules, and one or more cable connection modules.
Figure 8:
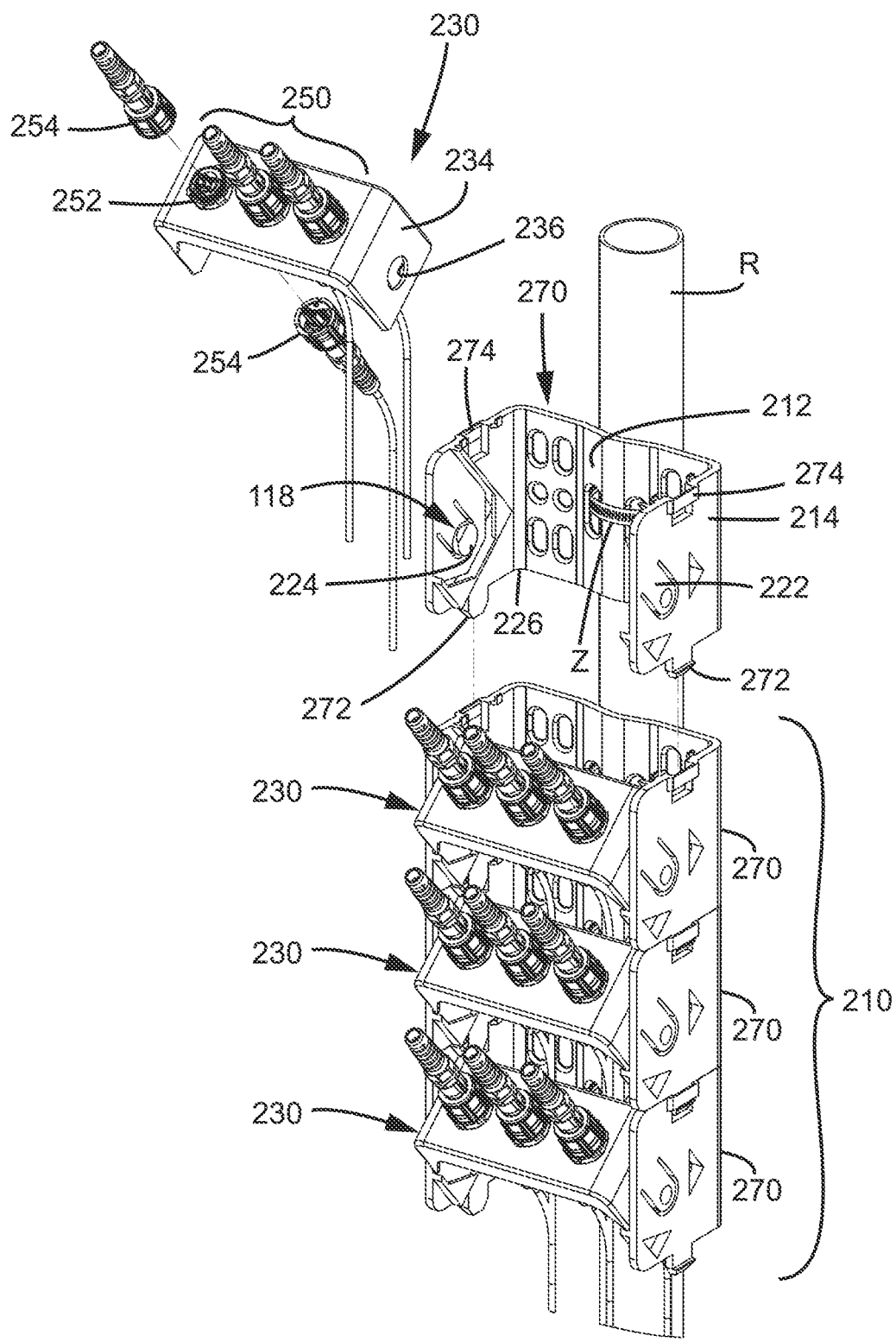
FIG. 8 shows a first base bracket module exploded upwardly from a remainder of the base bracket of FIG. 7 and a corresponding cable connection module exploded forwardly of the base bracket module.
Figure 9:
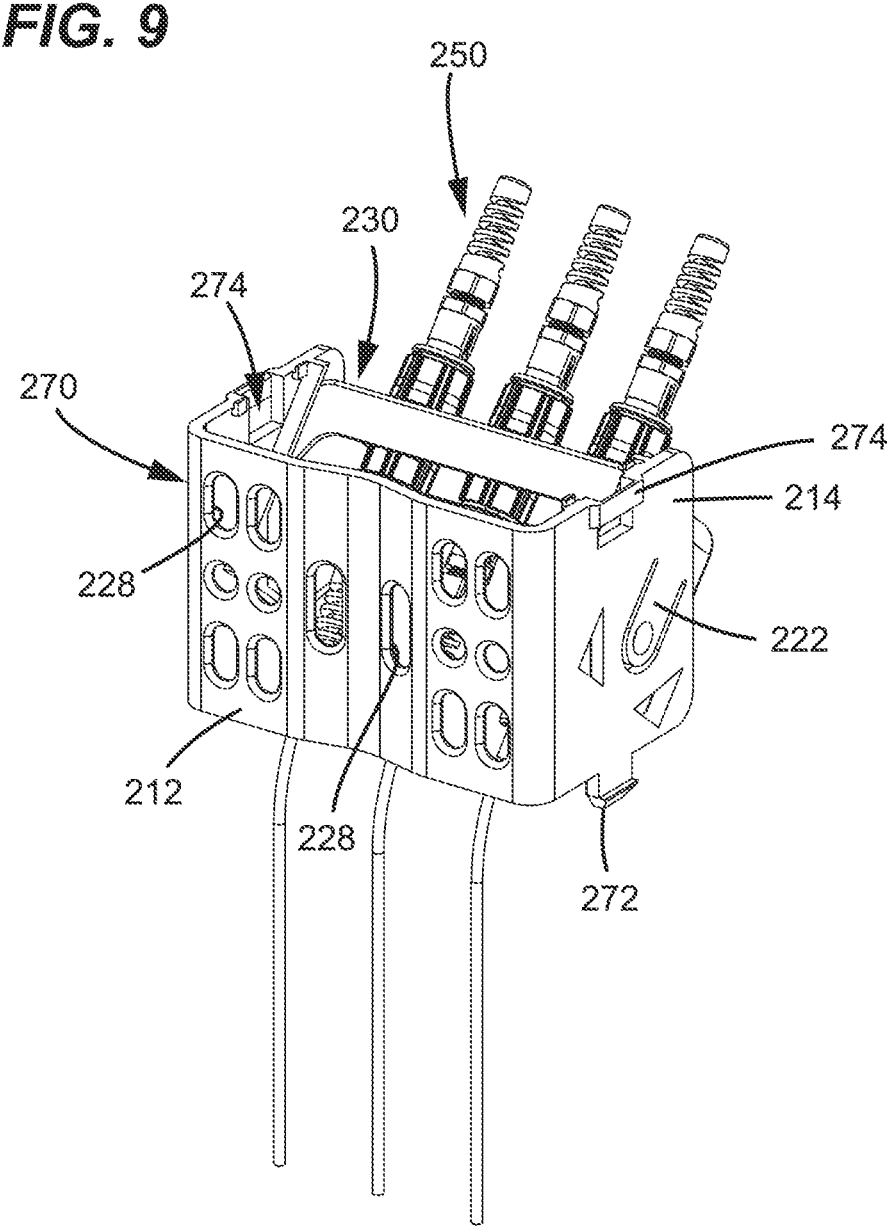
FIG. 9 is a rear perspective view of one of the base bracket modules and corresponding cable connection module of the second connection interface of FIG. 7 isolated from a remainder of the second connection interface.
Figure 10:
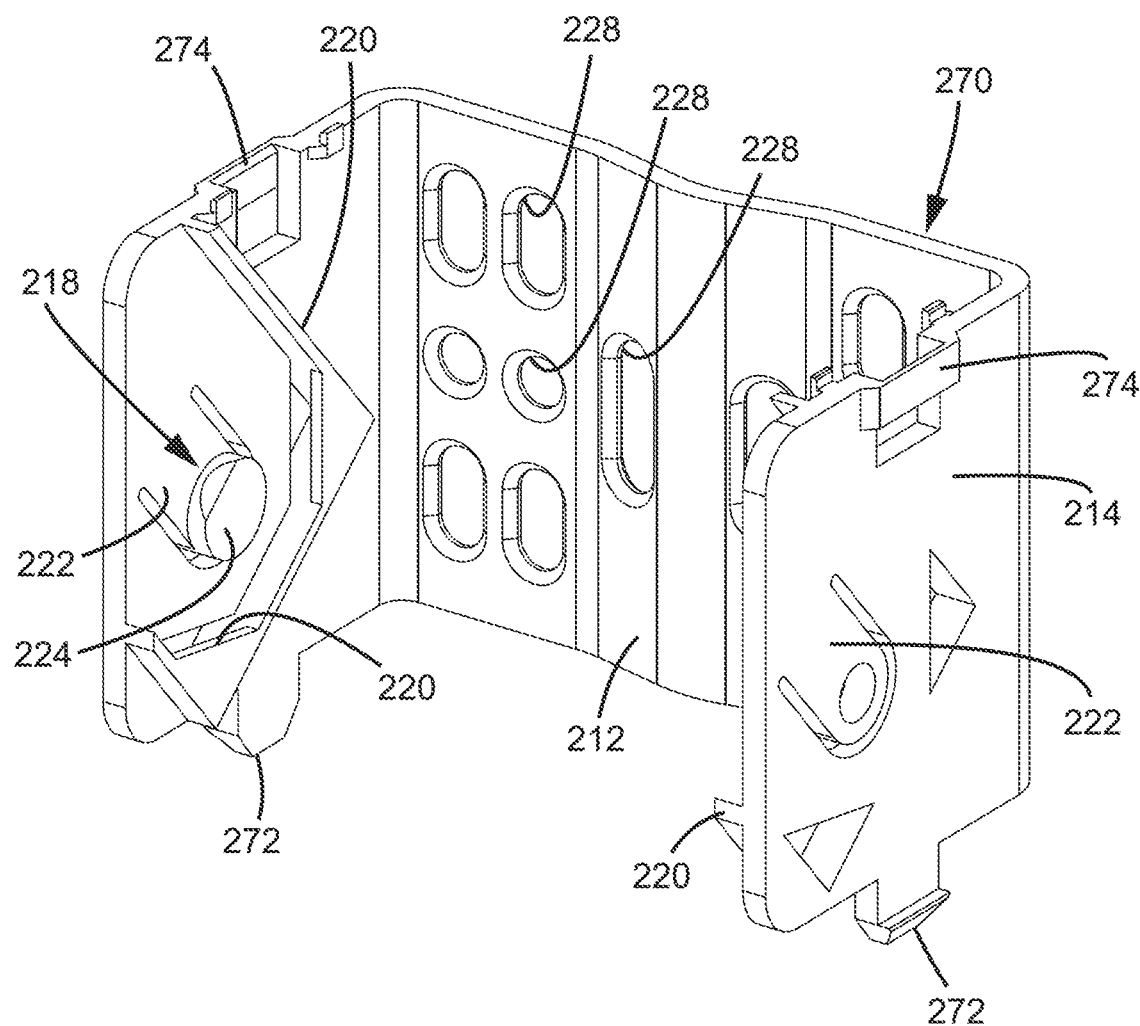
FIG. 10 is a front perspective view of an example base bracket module suitable for use with the second connection interface of FIG. 7.
Figure 11:
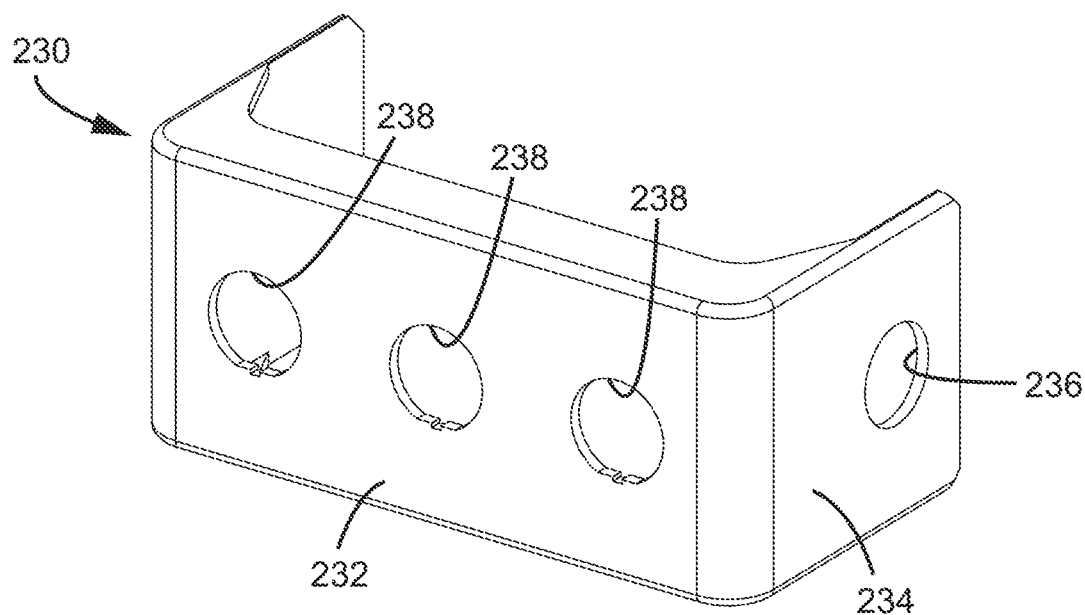
FIGS. 11 and 12 are front and rear perspective views of an example cable connection module suitable for use with the second connection interface of FIG. 7.
Figure 12:
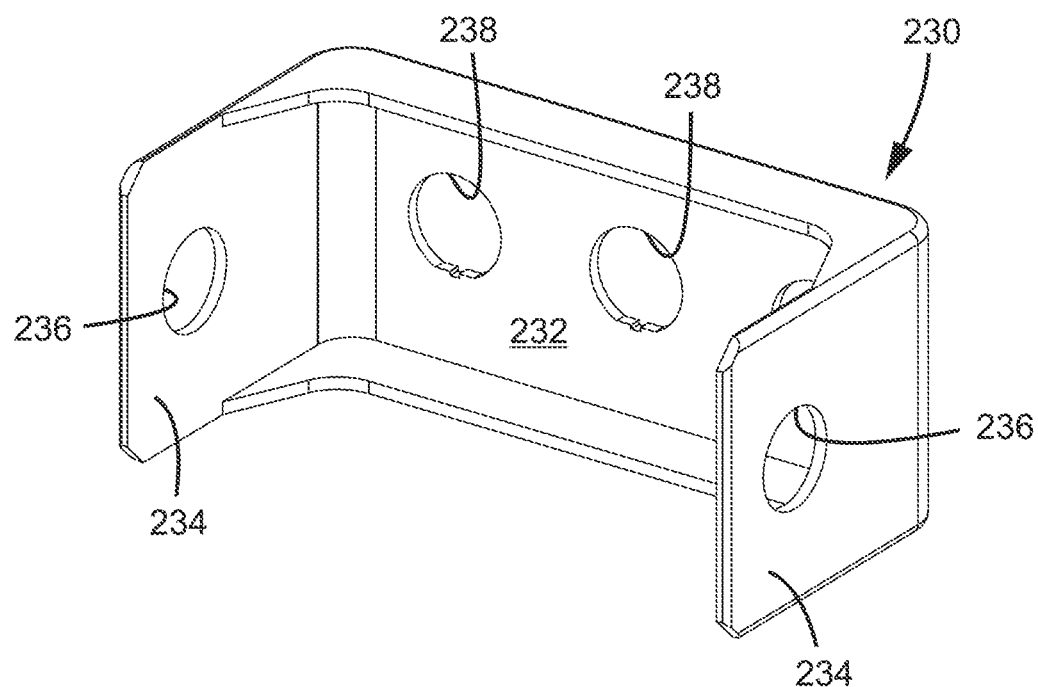
Figure 13:
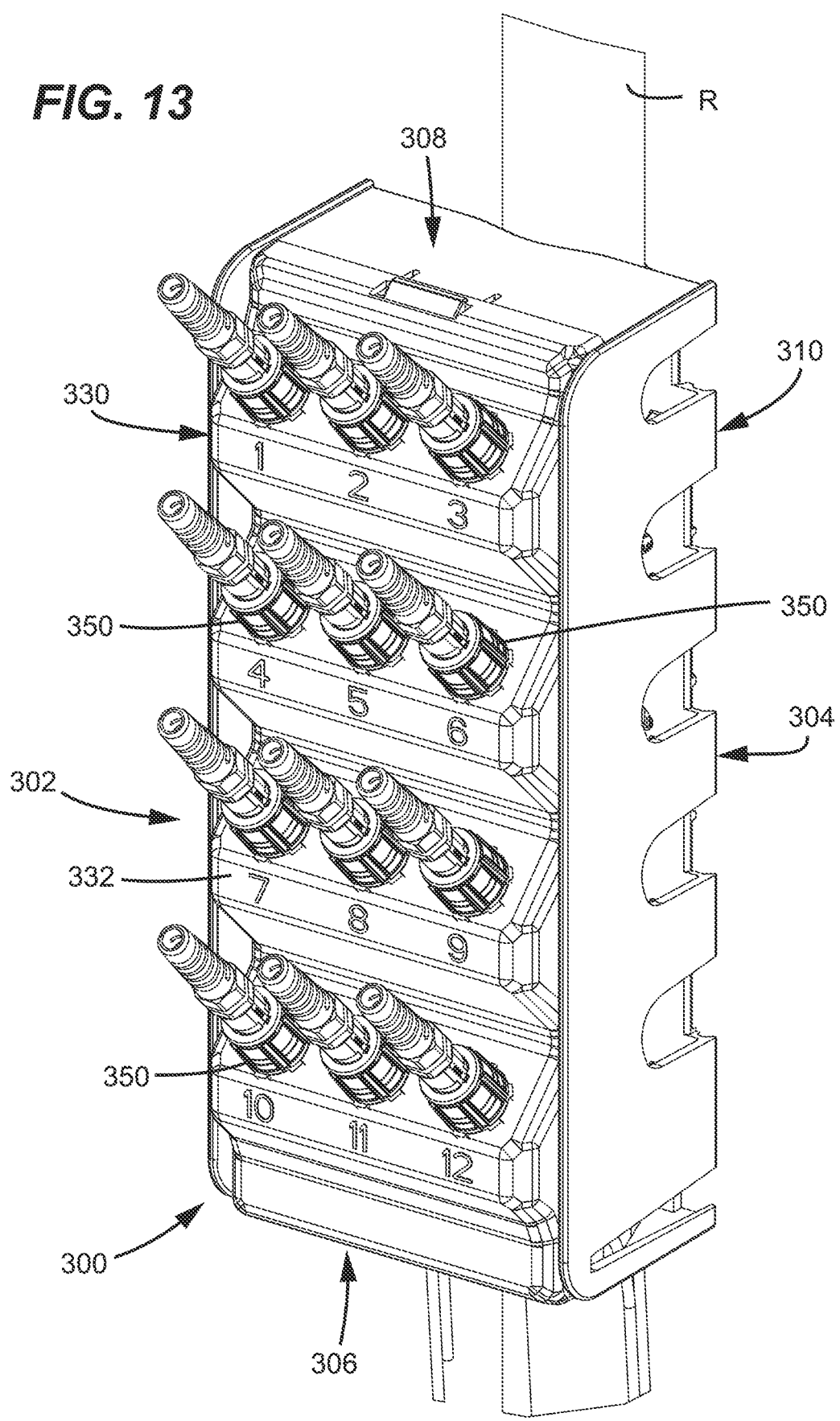
FIG. 13 is a front perspective view of a third example connection interface configured in accordance with the principles of the present disclosure, the third connection interface including a base bracket and a pivotal cable connection panel disposed in a closed configuration.
Figure 14:
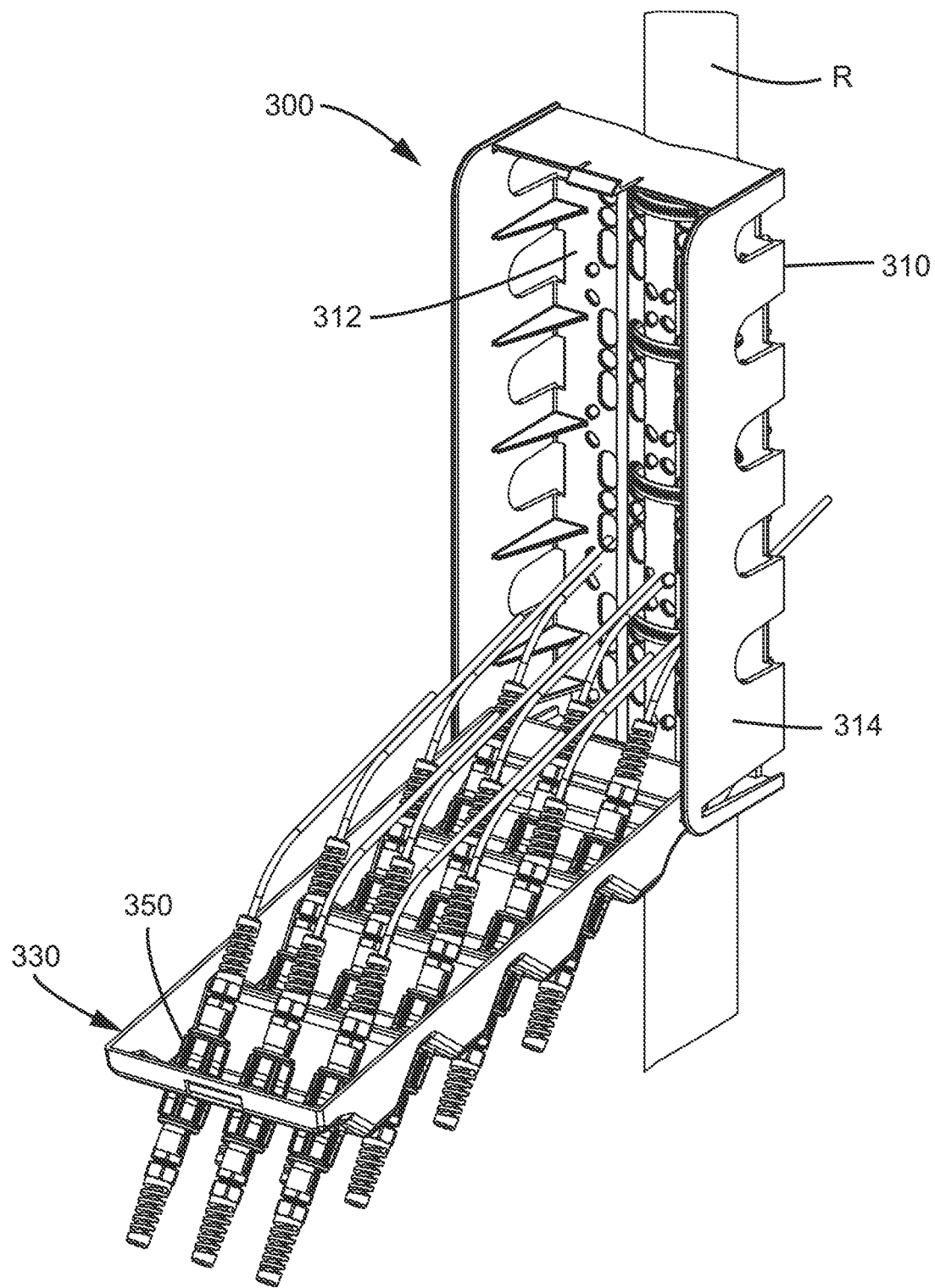
FIG. 14 shows the third connection interface disposed in an open configuration.
Figure 15:
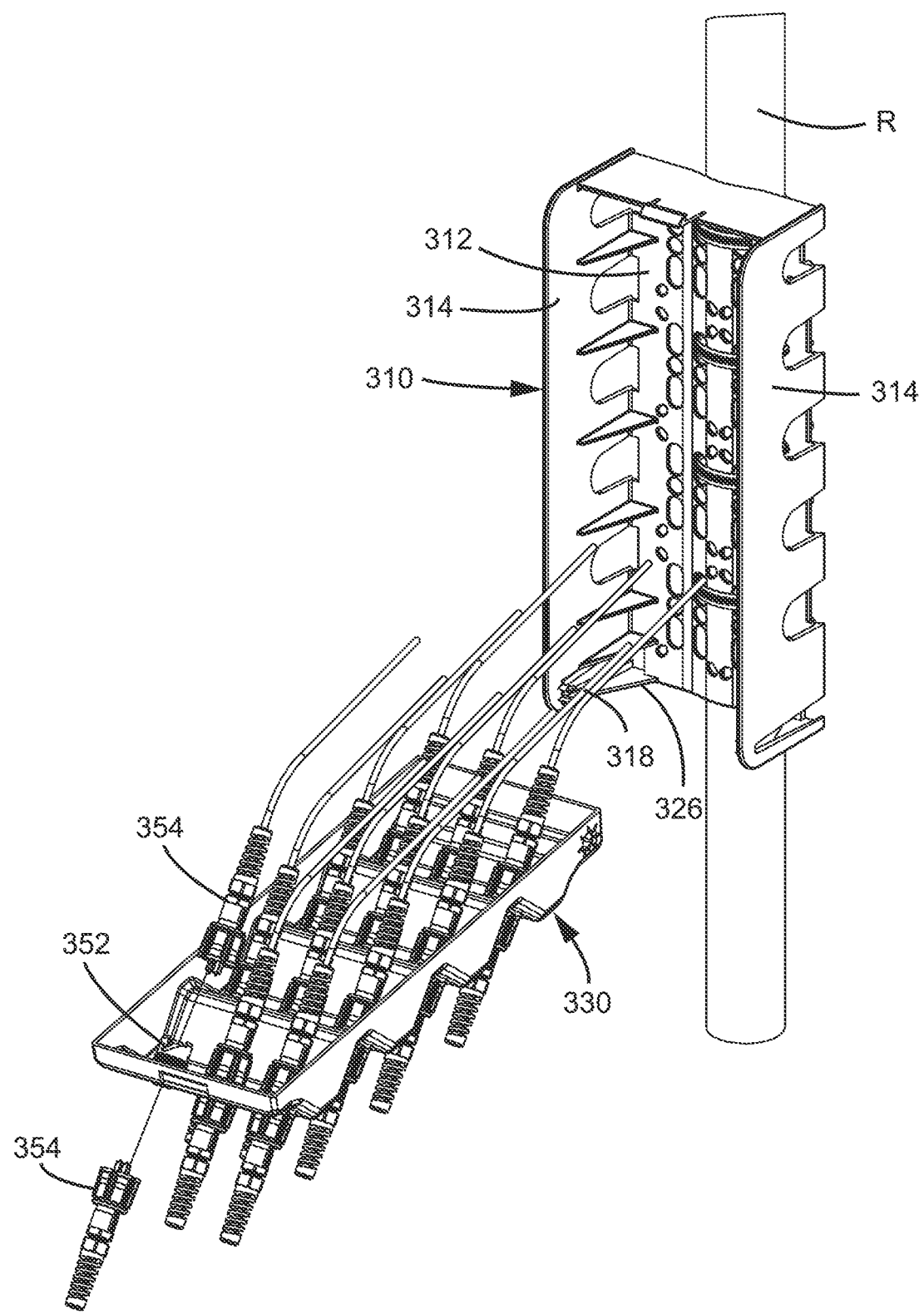
FIG. 15 is a front perspective view of the third connection interface of FIG. 13 with the cable connection panel exploded forwardly of the base bracket.
Figure 16:
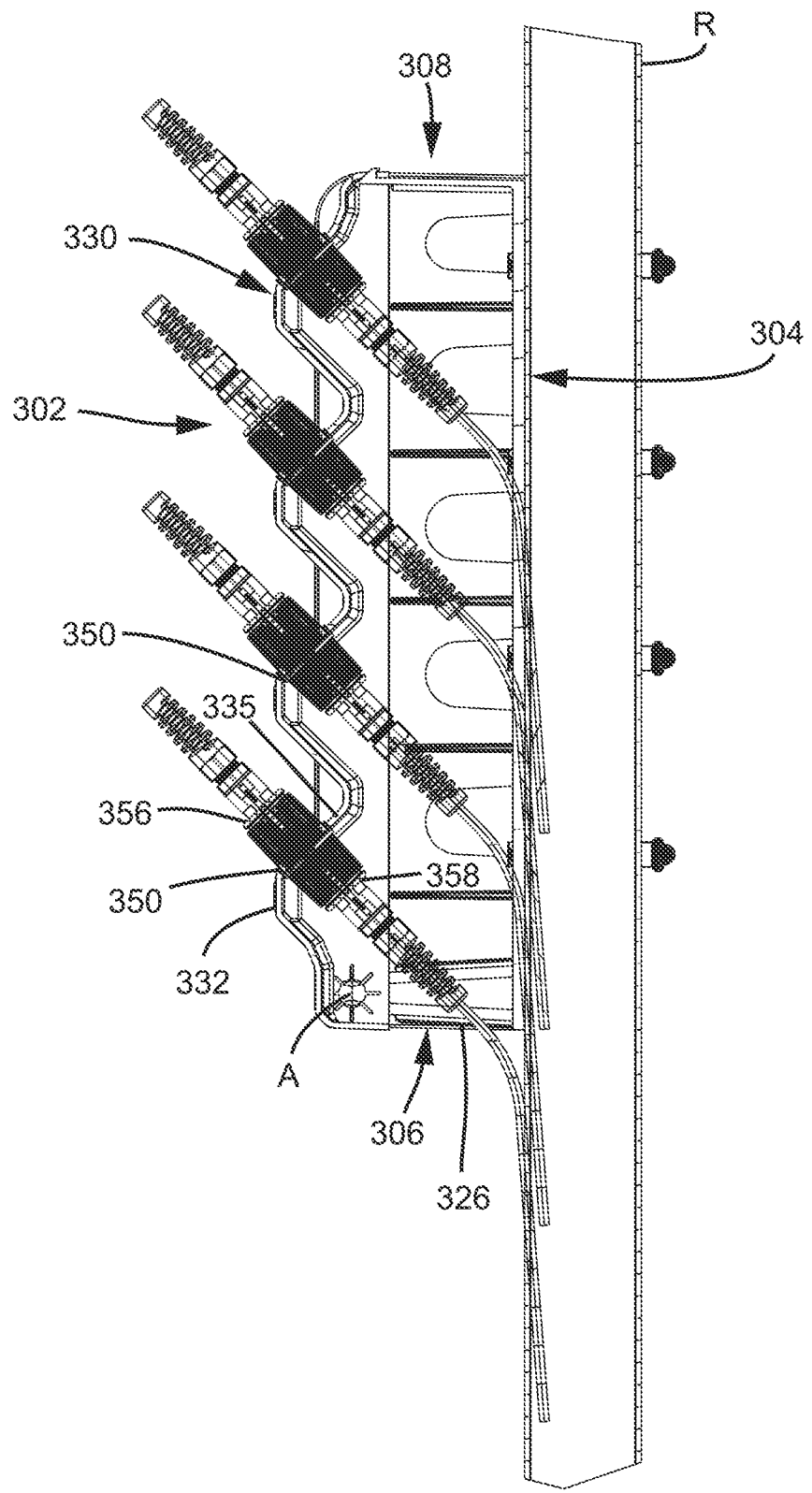
FIG. 16 is a transverse cross-section of the third connection interface of FIG. 13.
Figure 17:
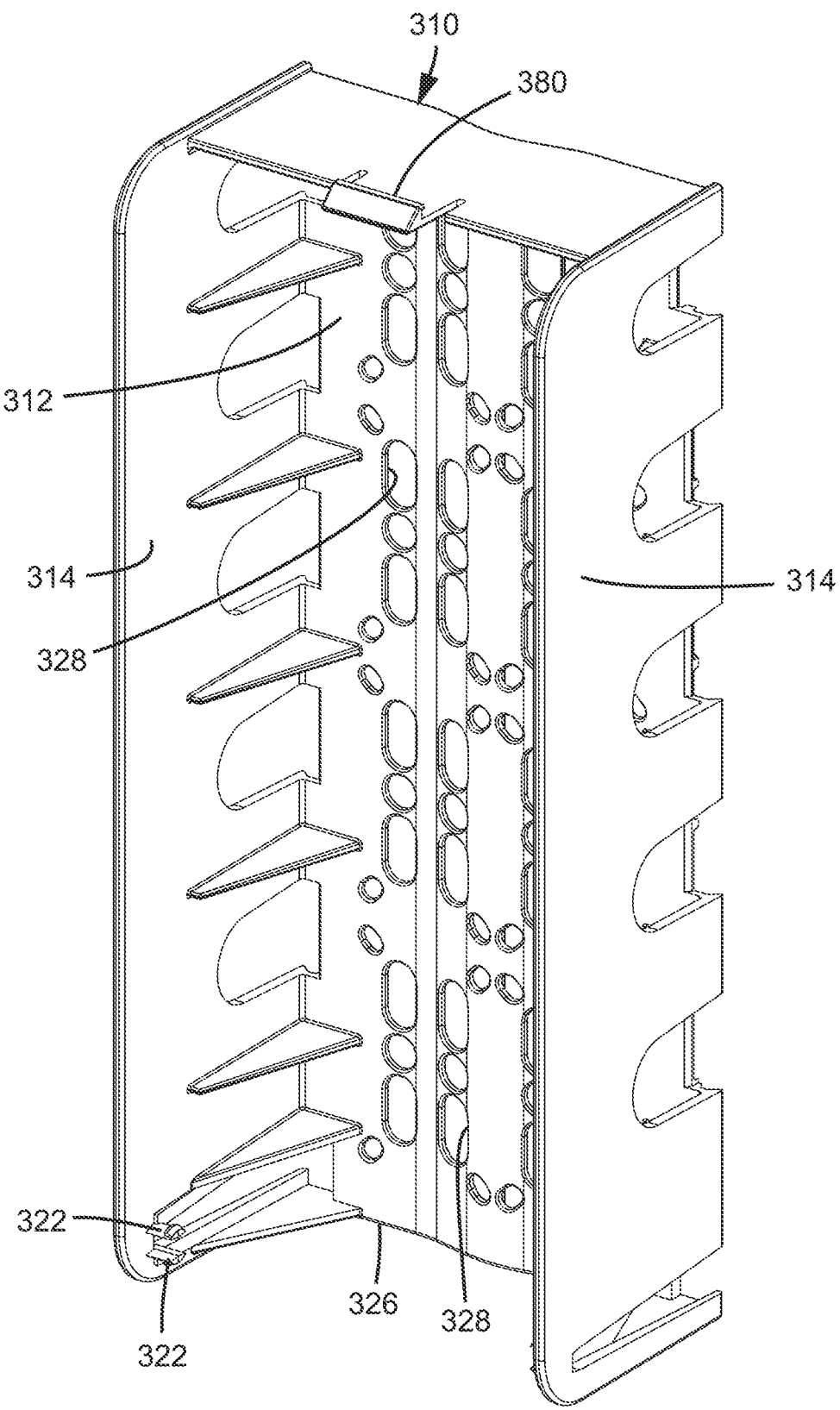
FIG. 17 is a front perspective view of an example base bracket suitable for use with the third connection interface of FIG. 13.
Figure 18:
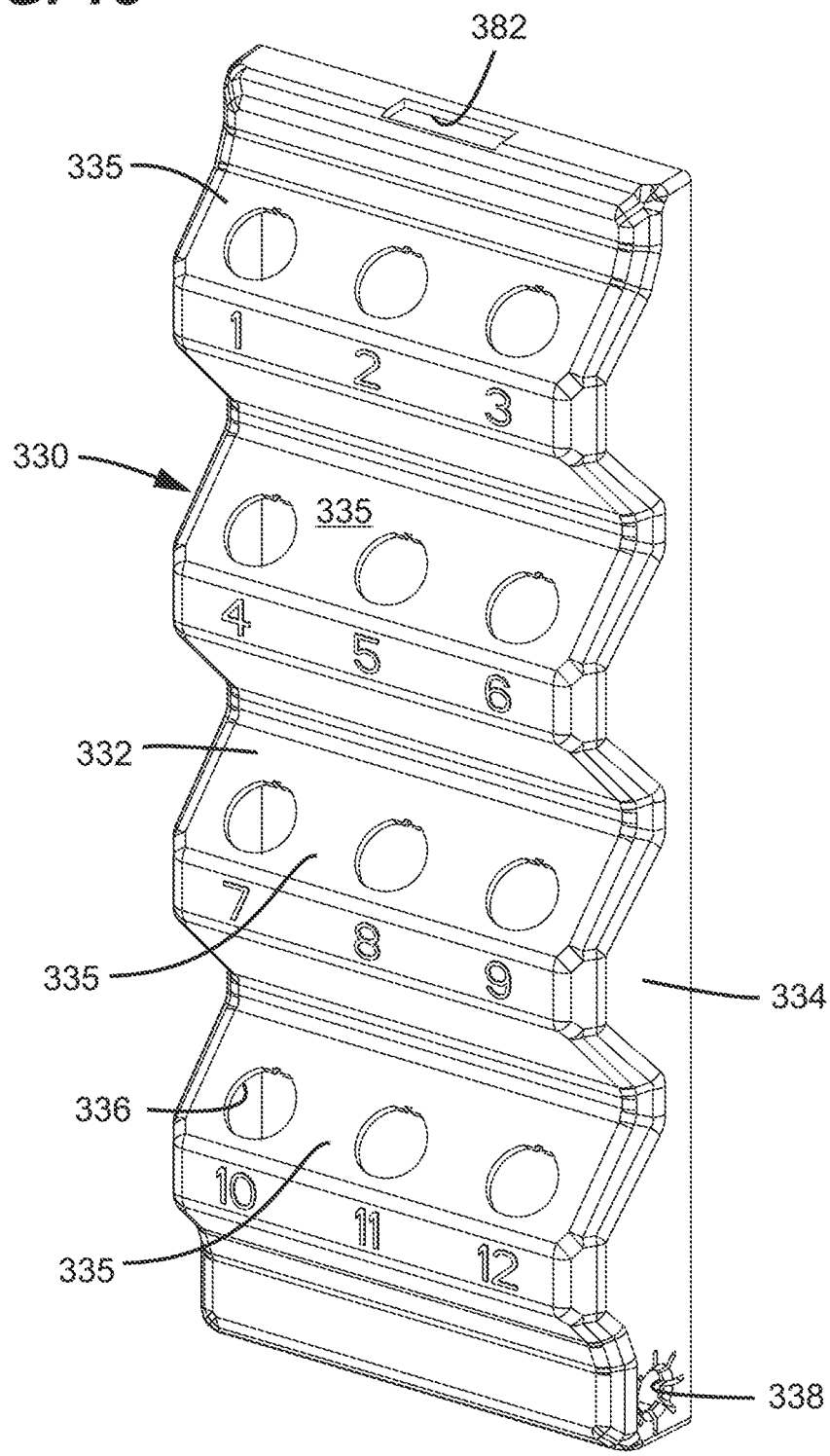
FIGS. 18 and 19 are front and rear perspective views of an example cable connection panel suitable for use with the third connection interface of FIG. 13.
Figure 19:
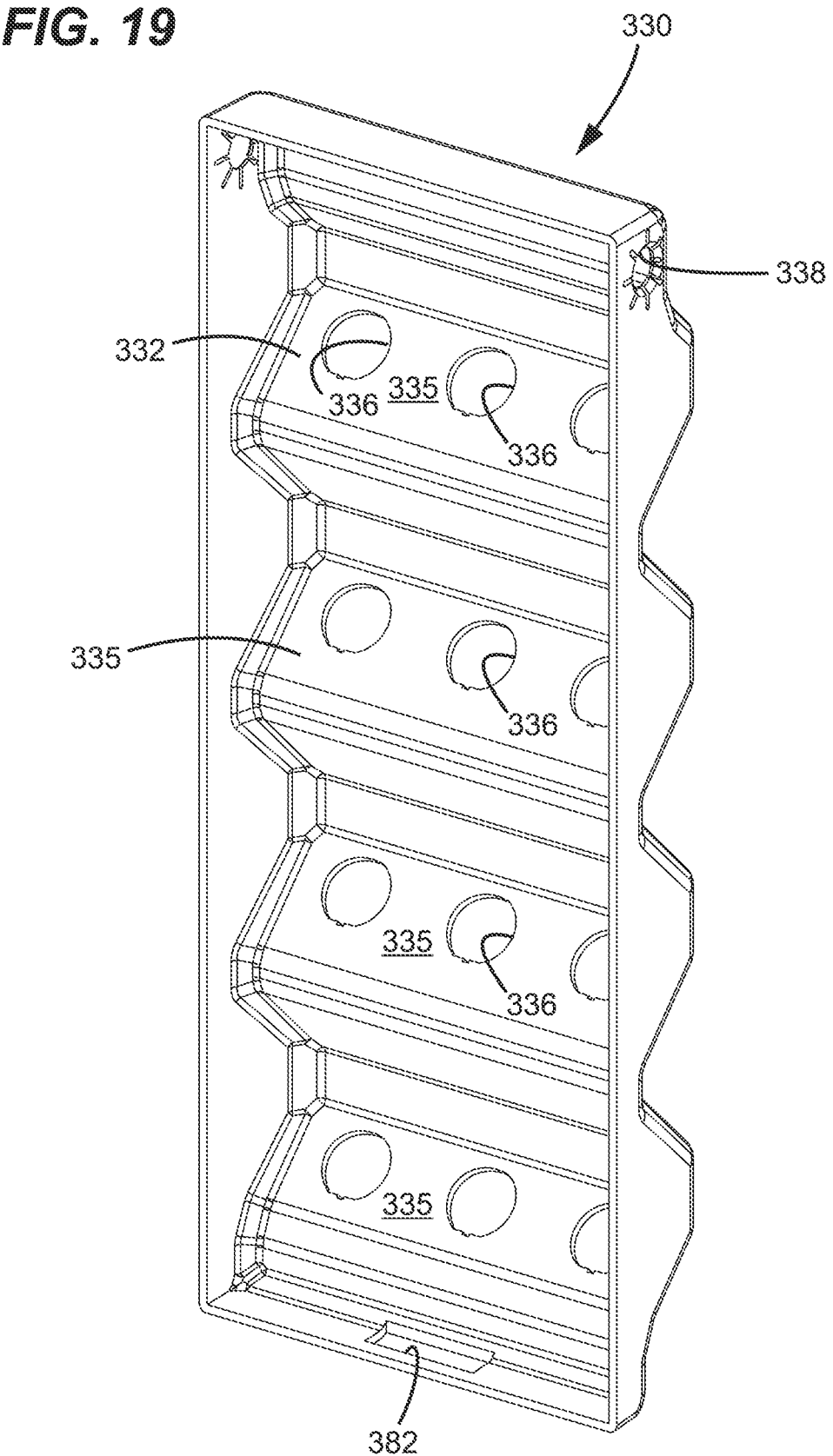

In certain implementations, the cable connection panel 330 pivotally connects to the bracket side walls 314 at a pivot axis A at the first end 306 of the base bracket 310 (see FIG. 16). The cable connection panel 330 is moveable relative to the base bracket 310 about the pivot axis A between an open position (FIG. 14) and a closed position (FIG. 13). The cable connection components 350 are carried by the cable connection panel 330 as the cable connection panel 330 moves between the open and closed positions.

The cable connection panel 330 covers the front 302 of the base bracket 310 when in the closed position. In the example shown, the rows of cable connection components 350 extend across the width W of the base bracket 310 when the cable connection panel 330 is in the closed position. The cable connection panel 330 provides access to an interior of the base bracket 310 and to a rear side of the cable connection panel 330 when in the open position.

In certain implementations, the cable connection panel 330 can be releasably secured to the base bracket 310 in the closed position. In certain examples, the cable connection panel 330 latches to the base bracket 310 adjacent the second end 308 of the base bracket 310 when the cable connection panel 330 is in the closed position. In the example shown, the base bracket 310 includes a latch finger 380 and the cable connection panel 330 includes a catch surface 382 configured to engage the latch finger 380. In other examples, the cable connection panel 330 has the latch finger and the base bracket 310 defines the catch surface. In still other examples, the cable connection panel 330 is otherwise releasable secured (e.g., friction fit, fastened, etc.) in the closed position.

In certain implementations, the cable connection panel 330 has a stepped configuration with component mounting surfaces 335 that are oriented at an oblique angle relative to the open front 302 of the base bracket 310 when the cable connection panel 330 is in the closed position (see FIG. 16).

In certain implementations, the cable connection components 350 include front ends 356 positioned at a front side of the cable connection panel 330 and rear ends 358 positioned at a rear side of the cable connection panel 330 (see FIG. 16). The cable connection components 350 are oriented with axes aligned at oblique angles relative to the front 302 of the base bracket 310 when the cable connection panel 330 is in the closed position. When the cable connection panel 330 is in the closed position, the rear ends 358 of the cable connection components 350 face at least partially toward the first end 306 of the base bracket 310 and the front ends 358 of the cable connection components 350 face at least partially toward the second end 308 of the base bracket 310.

FIGS. 21-41 illustrate the fourth implementation of the connection interface 400. The cable connection carrier 430 of the connection interface 400 includes component mounting surfaces 433 carried on the front wall 432. The component mounting surfaces 433 are angled relative to the front wall 432. In other words, each component mounting surfaces 433 is disposed at an angle A2 relative to the front reference plane P where the angle A2 is greater than the angle A1 (e.g., see FIG. 23). Angling the component mounting portions relative to the front wall 432 allows for optimization of the angle of the inner/rear ports and the outer/front ports of the optical components mounted to the cable connection carrier 430 while also optimizing the angle of the insertion path I to connect the cable connection carrier 430 the base bracket 410.

Figure 28:
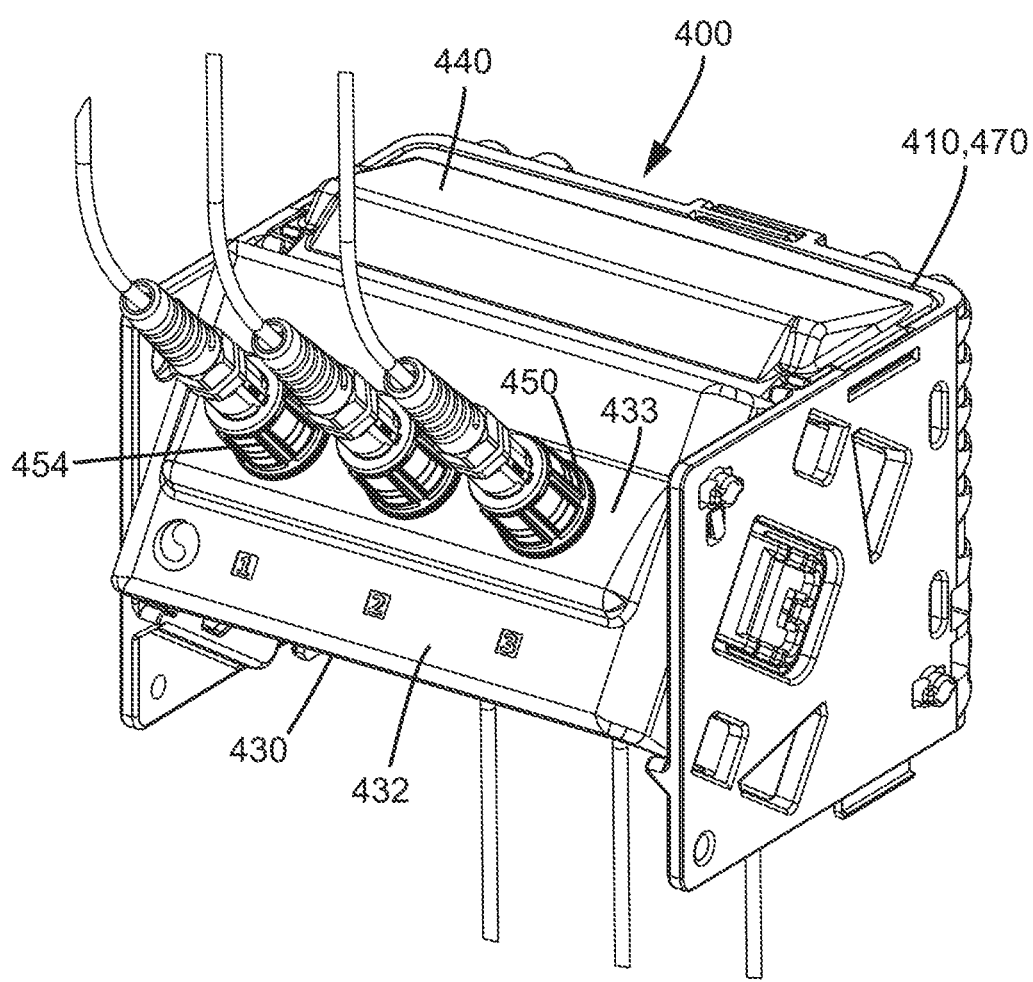
FIG. 28 is a top, front perspective view of the connection interface of FIG. 21 shown holding a single row of three optical adapters at which optical cables are interfaced together.
Figure 29:
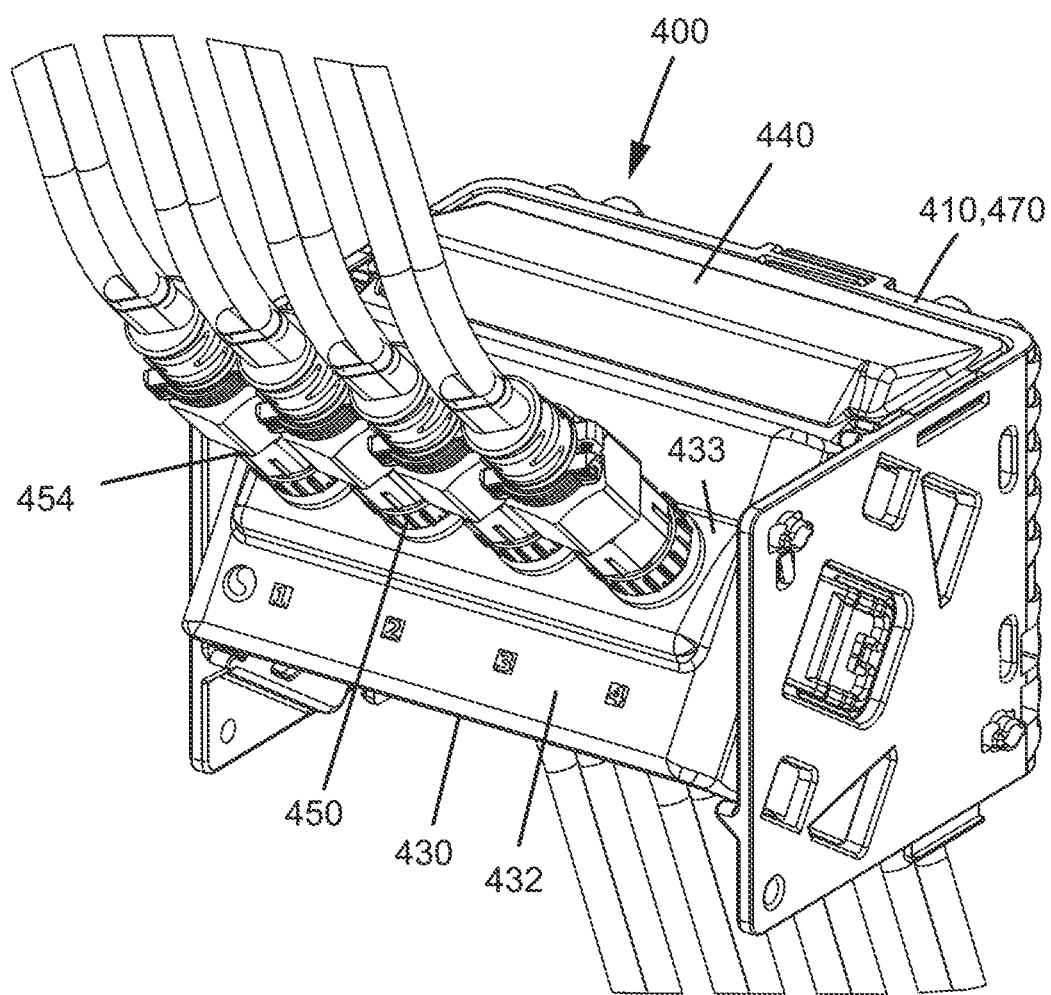
FIG. 29 is a top, front perspective view of the connection interface of FIG. 21 shown holding a single row of four power couplers at which power cables are interfaced together.

In some implementations, each cable connection carrier 430 includes a single component mounting surface 433 defining a row of apertures 438 for receiving components (e.g., see FIGS. 28 and 29). In other implementations, each cable connection carrier 430 includes multiple component mounting surface 433 each defining a row of apertures 438 for receiving components (e.g., see FIGS. 25 and 27). In certain examples, each of the component mounting surfaces 433 of a cable connection carrier 430 has a common angle relative to the front wall 432. In other implementations, the same component mounting surface 433 may define multiple rows of apertures 438 for receiving components 450.

In certain implementations, each aperture 438 in a row is configured to receive a common type of component 450. In some implementations, each row of apertures 438 of a cable connection carrier 430 is configured to receive a common type of component 450. In other implementations, however, each row of apertures 438 of a cable connection carrier 430 may receive a respective type of component 450. For example, one row of apertures 438 of a cable connection carrier 430 may be configured to receive optical adapters 452 and another row of apertures 438 of the same cable connection carrier 430 may be configured to receive power sockets/adapters 450 (e.g., see FIGS. 25-27).

Figure 33:
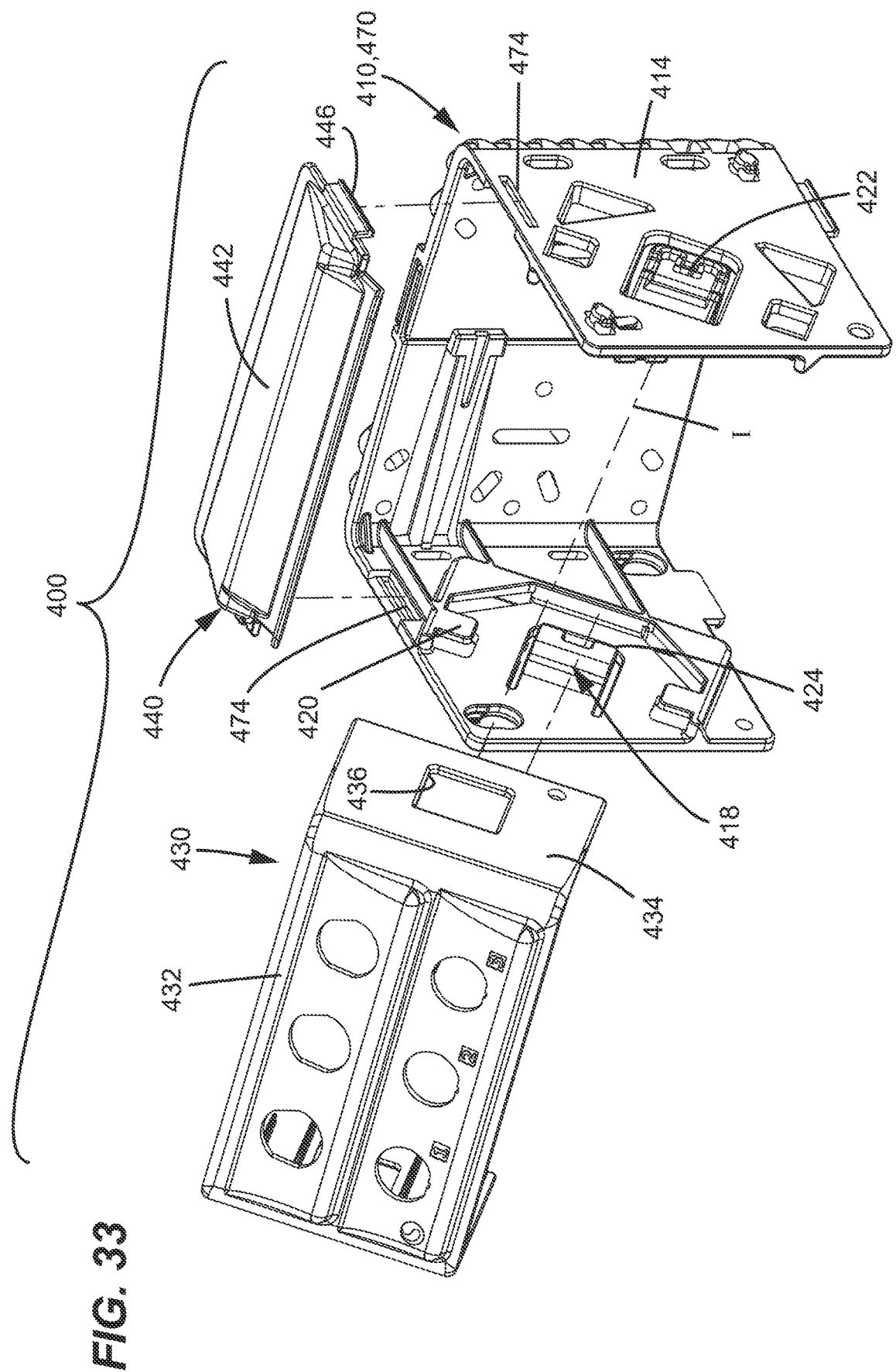
FIG. 33 is an exploded view of the connection interface of FIG. 21.
Figure 34:
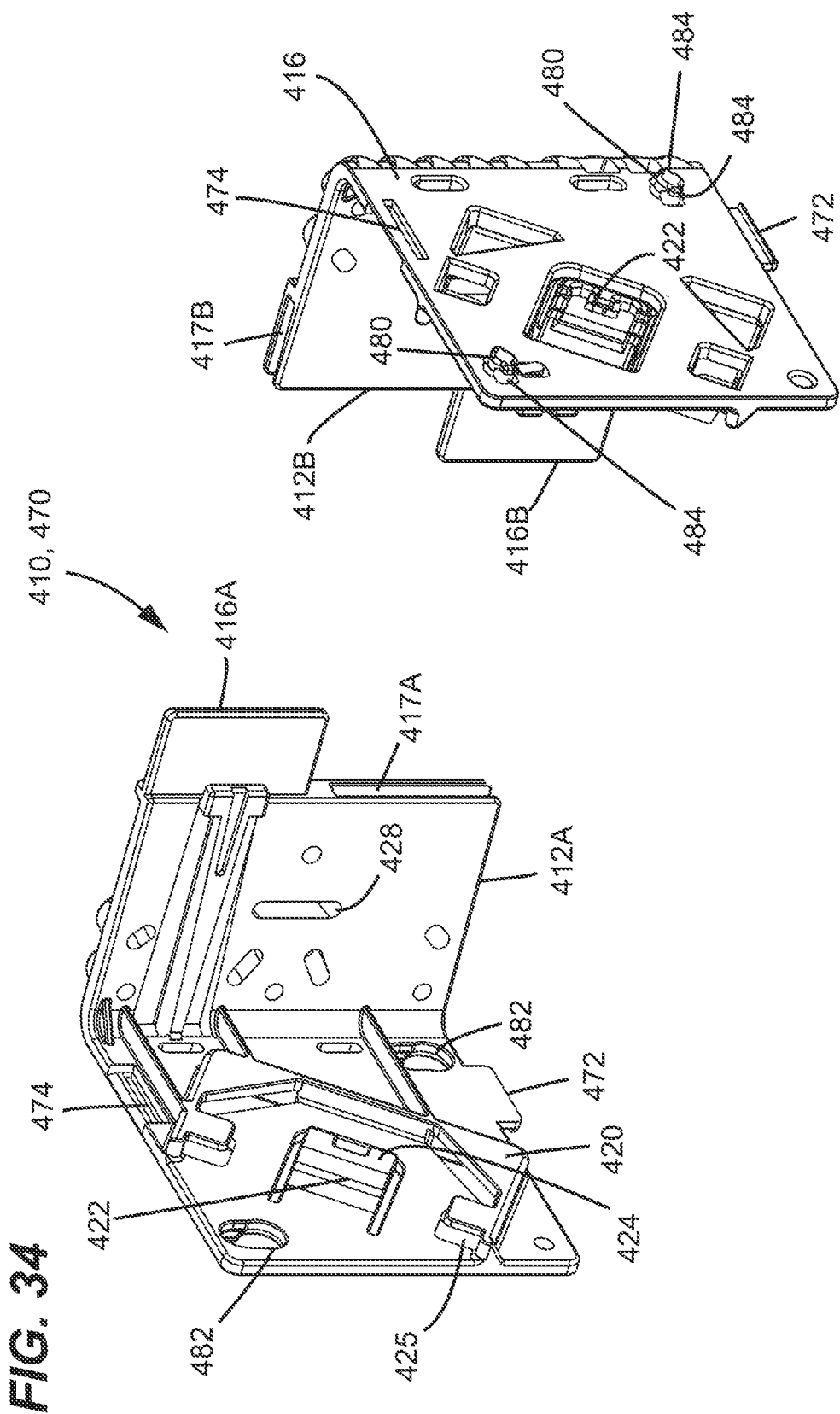
FIG. 34 is an exploded view of an example implementation of a base bracket suitable for use with the connection interface of FIG. 21.
Figure 35:
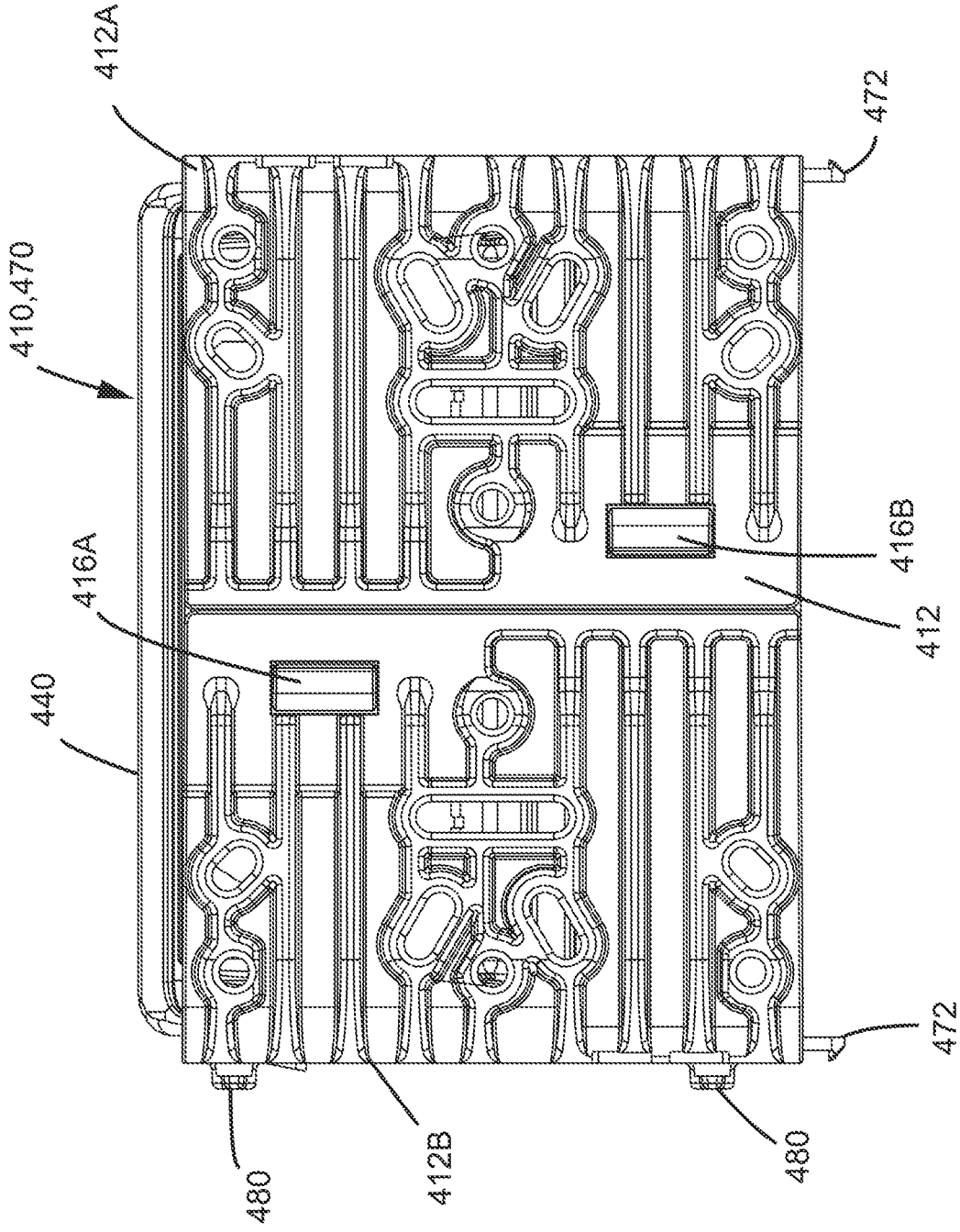
FIG. 35 is a rear elevational view of the connection interface of FIG. 21.
Figure 36:
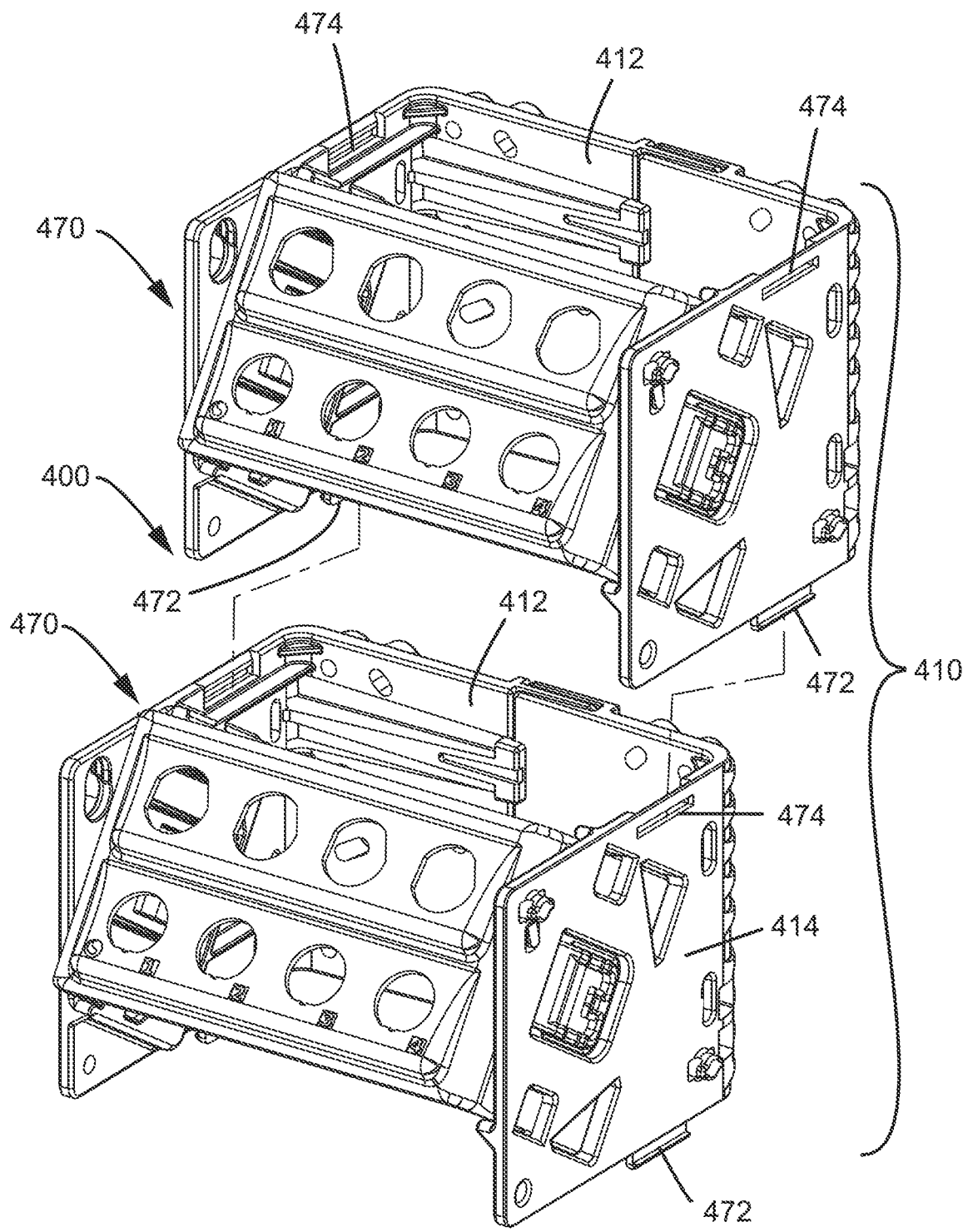
FIG. 36 illustrates the connection interface of FIG. 21 being stacked onto a second connection interface configured as shown in FIG. 21.
Figure 37:
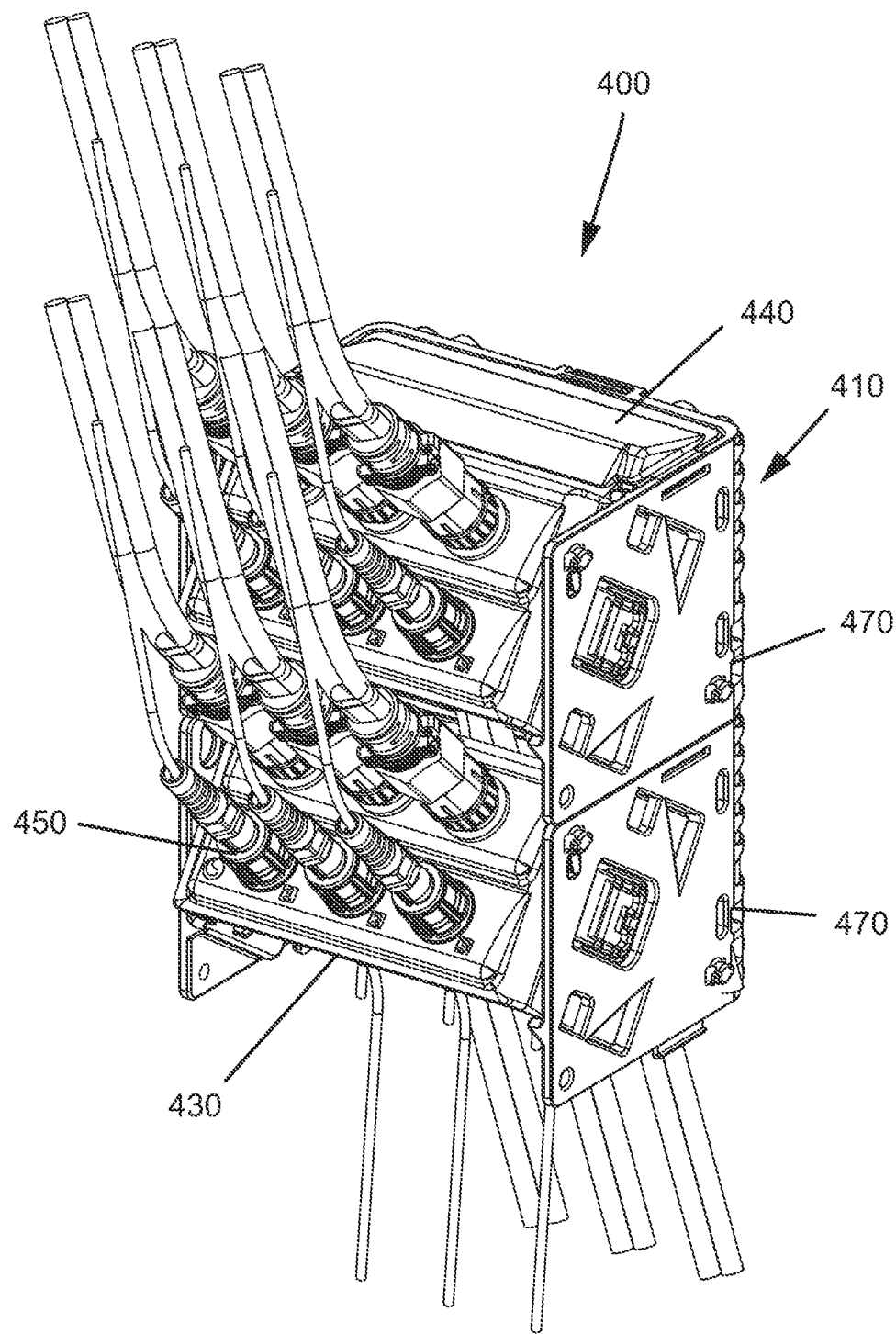
FIG. 37 shows two connection interfaces of FIG. 21 stacked together and cabled.

In certain implementations, each connection interface 400 includes a cover 440 that is configured to mount to the top 408 of the base bracket 410. The cover 440 extends over the top 408 between the base wall 412 and the cable connection carrier 430 and between the base bracket side walls 414. In certain examples, the cover 440 is not sealed to the base bracket 410. Rather, the cover 440 is configured to block snow from building up on the cables extending through the connection interface 400. For example, the cover 440 may have an angled top surface 442 to mitigate snow buildup (e.g., see FIGS. 25-29). As shown in FIG. 33, the cover 440 also may include latch arms 446 configured to mate with a respective the catch surface 474 of the base bracket 410 or base bracket module 470. In certain examples, the latch arms 446 of the cover are substantially the same as the latch arms 472 of the base bracket modules 470.

In certain implementations, the base bracket 410 or base bracket module 470 can be formed from multiple pieces. For example, in FIG. 34, the back bracket module 470 includes a first piece 412A and a second piece 412B that secure together to form the base bracket module 470. In certain examples, each piece 412A, 412B defines one of the base bracket side walls 414 and a portion of the base wall 412. In certain implementations, the first and second pieces 412A, 412B are configured to remain assembled once connected together.

In certain implementations, each of the pieces 412A, 412B of the base bracket module 470 includes a portion of a securement arrangement that holds the pieces 412A, 412B together. In certain examples, the securement arrangement includes a latching arrangement. In certain examples, each piece 412A, 412B includes a latch arm 416A, 416B and defines a latch receiving cavity 417A, 417B, respectively. The latch arm 416A, 416B of each piece 412A, 412B is configured to be received within the latch receiving cavity 417A, 417B of the other piece 412B, 412A.

Figure 38:
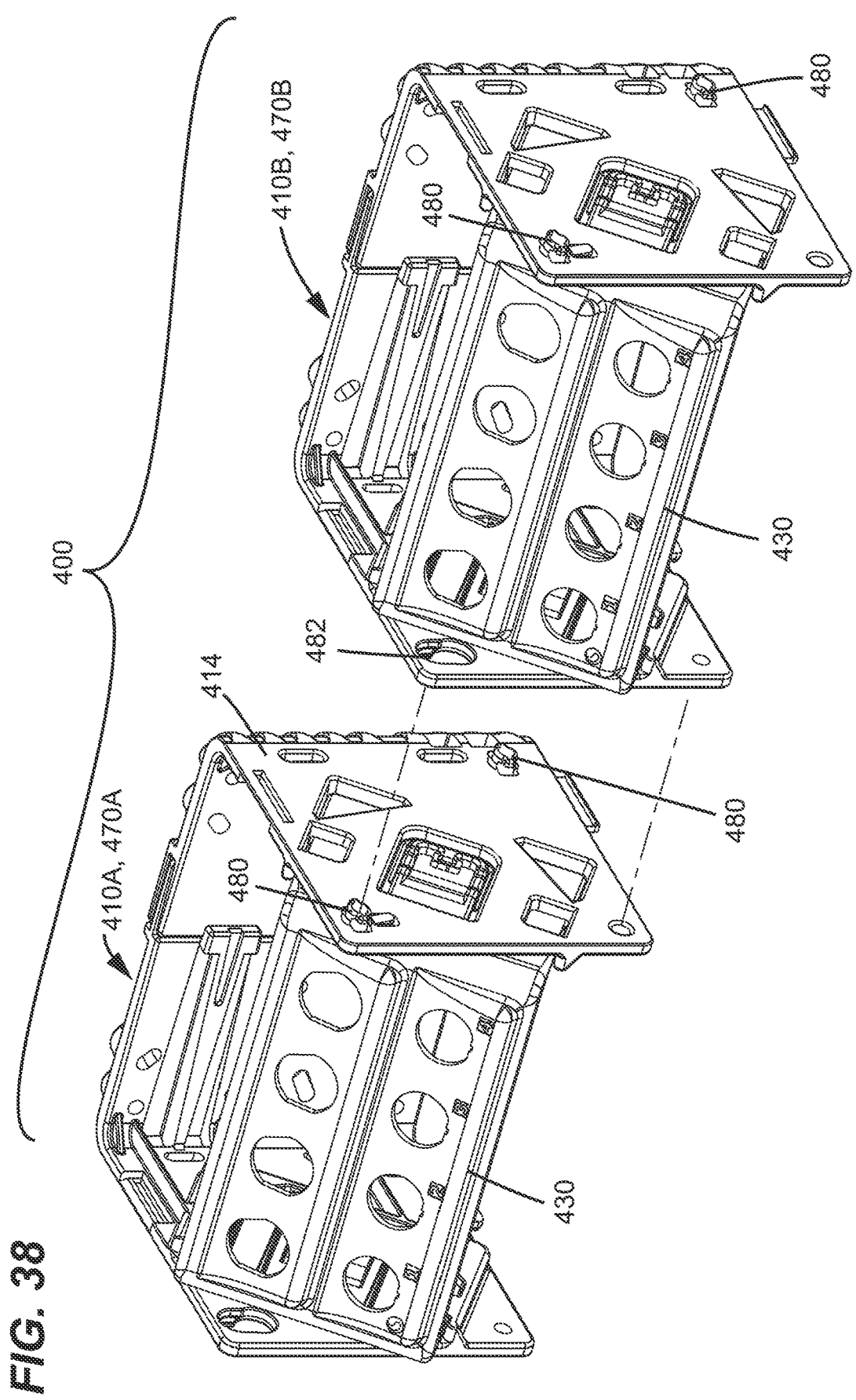
FIG. 38 illustrates the connection interface of FIG. 21 being laterally mounted to a second connection interface configured as shown in FIG. 21.
Figure 39:
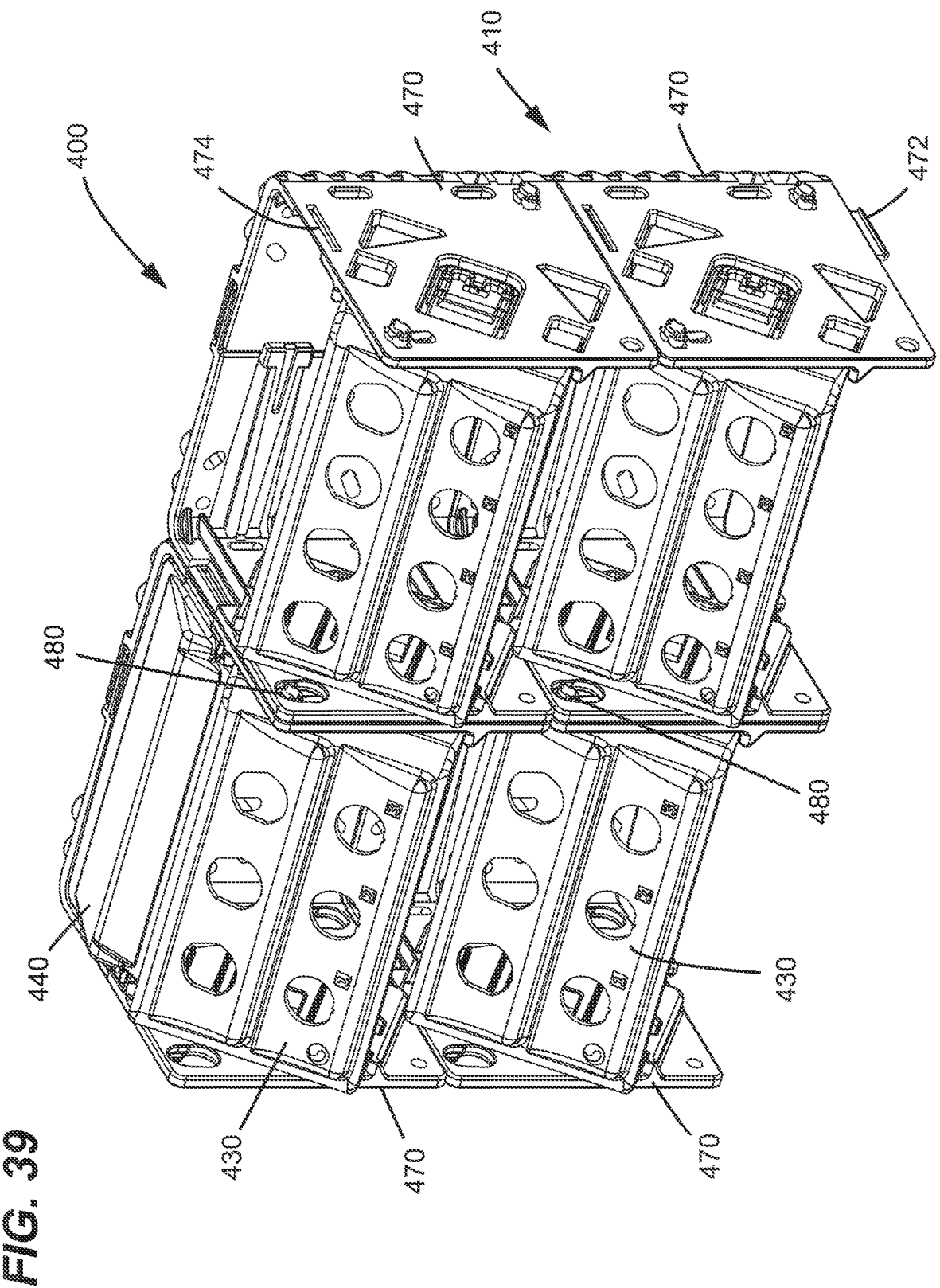
FIG. 39 illustrates four connection interfaces of FIG. 21 being stacked and laterally mounted together in a rectangular configuration so that two stacks of base bracket modules are laterally coupled together.
Figure 40:
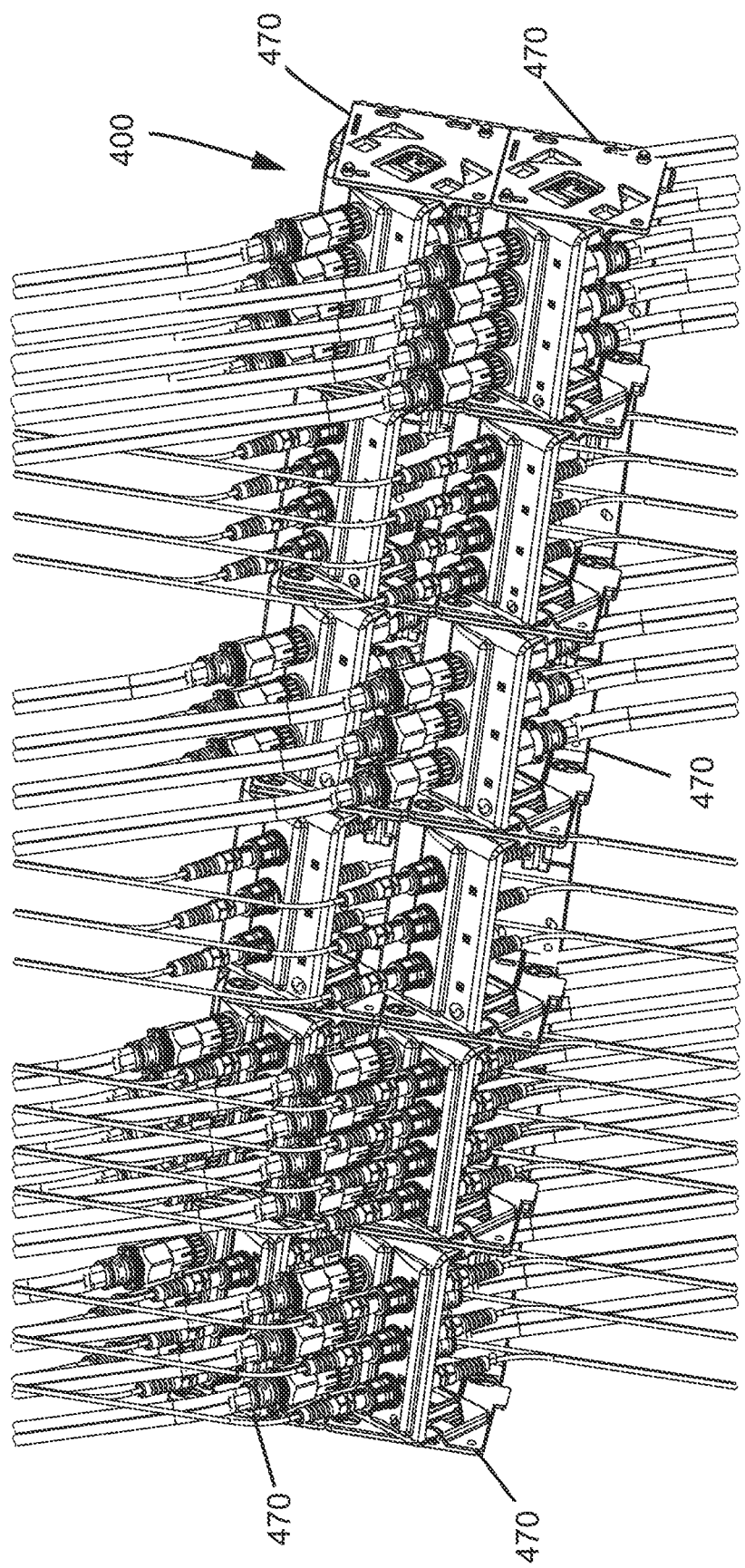
FIG. 40 illustrates a connection interface formed from six stacks of base bracket modules laterally mounted together, each of the stacks including two base bracket modules, each base bracket module holding a cable connection carrier.

In certain implementations, two or more base brackets 410 or base bracket modules 470 can be mounted together laterally as shown in FIGS. 38-40. One of the base bracket side walls 414 of each base bracket 410 or base bracket module 470 includes one or more protruding tabs 480 and the other base bracket side wall 414 defines a corresponding number of mounting apertures 482. In certain examples, each protruding tab 480 include wings 484 or other extensions extending radially outwardly from the protruding tab 480. In certain examples, each mounting aperture 482 defines a keyhole shape having a bottom portion 486 that is wider than a top portion 488 (e.g., see FIG. 26). The bottom portion 486 is sized to receive the tabs 480 with the wings 484 therethrough while the top portion 488 is sized narrower than the wings 484.

Accordingly, a first base bracket module 470A can be mounted to a second base bracket module 470B by sliding a first of the sidewalls 414 of the first base bracket module 470A towards a second of the sidewalls 414 of the second base bracket module 470B so that the tabs 480 of the first sidewall 414 extend into the bottom portions 486 of the apertures 482 of the second sidewall 414 (e.g., see FIG. 38). The first base bracket module 470A is then moved upwardly relative to the second base bracket module 470B sufficient to move the tabs 480 into the narrow portions 488 of the apertures 482 (e.g., see FIG. 39). When the tabs 480 move into the narrow portions 488, the wings 484 of the tabs 480 slide over a catch surface (e.g., an inner surface of the second sidewall 414).

As further shown in FIGS. 39 and 40, stacks of two or more base bracket modules 470 can be laterally coupled together. In some implementations, each base bracket module 470 can be separately attached to a rail R, pole, or other mounting structure. In other implementations, each stack of modules 470 can be separately attached to a rail R, pole, or other mounting structure. In still other implementations, one of two or more laterally coupled modules 470 is attached directly to a rail R, pole, or other mounting structure.

Having described the preferred aspects and implementations of the present disclosure, modifications and equivalents of the disclosed concepts may readily occur to one skilled in the art. However, it is intended that such modifications and equivalents be included within the scope of the claims, which are appended hereto.

What is claimed is:

1. A connection interface comprising:
a base bracket having a height extending between opposite first and second ends, a depth extending between a front and a back, and a width extending between opposite first and second sides, the base bracket including a base wall defining the back, the base bracket also including first and second opposite base bracket side walls that define the first and second sides of the base bracket, the first and second base bracket side walls project forwardly from the base wall to the front of the base bracket to define a passage extending along the height of the base bracket, the base bracket defining a snap-fit module mounting interface between the first and second base bracket side walls, wherein the base bracket includes latch arms extending outwardly from a bottom of the base bracket and the base bracket defines catch surfaces at a top of the base bracket in vertical alignment with the latch arms;
a cable connection module having a front wall, the cable connection module connecting to the base bracket at the snap-fit module mounting interface to orient the front wall at a first non-zero angle relative to the height of the base bracket, the cable connection module including a component mounting surface disposed at the front wall, the component mounting surface being disposed at a second non-zero angle relative to the height of the base bracket, the second angle being different than the first angle; and
a cover configured to mount to the catch surfaces of the base bracket.

2. The connection interface of claim 1, further comprising a plurality of cable connection components disposed at the component mounting surface.

3. The connection interface of claim 2, wherein the cable connection components are disposed in a row.

4. The connection interface of claim 3, wherein the cable connection components are first cable connection components and the row is a first row; and wherein a plurality of second cable connection components are disposed at the cable connection module in a second row extending parallel with the first row.

5. The connection interface of claim 4, wherein the second cable connection components are different than the first cable connection components.

6. The connection interface of claim 5, wherein the component mounting surface is a first component mounting surface; and wherein a second component mounting surface is disposed at the front wall, the second cable connection components being disposed at the second component mounting surface.

7. The connection interface of claim 6, wherein the second component mounting surface is disposed at a non-zero angle relative to the height of the base bracket that is different than the first angle.

8. The connection interface of claim 7, wherein the non-zero angle of the second component mounting surface is the same as the second non-zero angle.

9. The connection interface of claim 5, wherein the first cable connection components includes optical connector ports; and wherein the second cable connection components include power connector ports.

10. The connection interface of claim 1, wherein the front wall intersects a reference plane extending along the front of the base bracket, wherein a rearward portion of the front wall is located rearward of the reference plane and between the bracket side walls; and wherein a forward portion of the front wall is located forward of the reference plane and forward of the base bracket.

11. The connection interface of claim 1, wherein the snap-fit module mounting interface is adapted to receive the cable connection module along a linear insert path.

12. The connection interface of claim 1, wherein the base bracket is formed from first and second pieces that latch together, each of the first and second pieces defining one of the first and second side walls of the base bracket.

13. The connection interface of claim 1, wherein the base bracket includes a plurality of base bracket modules that are stacked together to form the base bracket, and wherein each of the base bracket modules defines a separate module mounting location.

14. The connection interface of claim 13, wherein each of the base bracket modules is formed from first and second pieces that latch together.

15. The connection interface of claim 1, wherein the first base bracket side wall includes tabs protruding outwardly from the base bracket; and wherein the second base bracket side wall defines apertures laterally aligned with the tabs.

16. A cable connection interface comprising:
a plurality of base bracket modules including a first base bracket module and a second base bracket module, each of the base bracket modules including a base wall extending between a top and a bottom and extending between first and second side walls, each of the sidewalls defining an internally facing mounting receptacle, each of the base bracket modules including a first part of a first attachment arrangement disposed at the top of the base bracket module and a corresponding second part of the first attachment arrangement disposed at the bottom of the base bracket module, each of the base bracket modules also including a first part of a second attachment arrangement disposed at one of the first and second side walls and a second part of the second attachment arrangement disposed at the other of the first and second side walls,
wherein the first and second base bracket modules are selectably mountable together in either of a first configuration and a second configuration, wherein when in the first configuration, the second part of the first attachment arrangement of the first of the base bracket modules engages the first part of the first attachment arrangement of a second of the base bracket modules, and wherein when in the second configuration, the second part of the second attachment arrangement of the first base bracket module engages the first part of the second attachment arrangement of the second base bracket module; and
a plurality of cable connection carriers mountable to the base bracket modules; and
at least one cover configured to mount to the first part of the base bracket module.

17. The cable connection interface of claim 16, wherein each cable connection carrier is configured to hold a plurality of cable connection components in a row.

18. The cable connection interface of claim 17, wherein a first of the connection carriers is configured to hold the cable connection components in a plurality of rows.

* * * * *